(12) United States Patent
Miyahisa et al.

(10) Patent No.: US 7,842,418 B2
(45) Date of Patent: Nov. 30, 2010

(54) ELECTRODE PLATE FOR BATTERY, ELECTRODE GROUP FOR BATTERY, LITHIUM SECONDARY BATTERY, METHOD FOR PRODUCING ELECTRODE PLATE FOR BATTERY AND APPARATUS FOR PRODUCING ELECTRODE PLATE FOR BATTERY

(75) Inventors: Masaharu Miyahisa, Osaka (JP); Yoshiki Ohsawa, Osaka (JP); Hideyuki Kumakiri, Osaka (JP); Tsutomu Nishioka, Osaka (JP); Shusaku Goto, Osaka (JP); Takeshi Kasamatsu, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/516,969

(22) PCT Filed: Jul. 22, 2008

(86) PCT No.: PCT/JP2008/001944

§ 371 (c)(1),
(2), (4) Date: May 29, 2009

(87) PCT Pub. No.: WO2009/013889

PCT Pub. Date: Jan. 29, 2009

(65) Prior Publication Data

US 2009/0325045 A1 Dec. 31, 2009

(30) Foreign Application Priority Data

Jul. 20, 2007 (JP) .............................. 2007-189334
Aug. 3, 2007 (JP) .............................. 2007-203434
Jul. 18, 2008 (JP) .............................. 2008-187405

(51) Int. Cl.
*H01M 4/02* (2006.01)
*H01M 4/00* (2006.01)
*H01M 6/10* (2006.01)
*H01M 4/82* (2006.01)

(52) U.S. Cl. .................. 429/209; 429/94; 29/623.1; 29/623.3

(58) Field of Classification Search .................. 429/94, 429/209; 29/623.1–623
See application file for complete search history.

(56) References Cited

U.S. PATENT DOCUMENTS

2005/0053833 A1  3/2005  Hayashida et al.
2006/0051669 A1  3/2006  Hayashida et al.

FOREIGN PATENT DOCUMENTS

JP  09-298057  11/1997

(Continued)

OTHER PUBLICATIONS

Japanese Office Action, with English Translation, issued in Japanese Patent Application No. JP 2008-187405, dated Apr. 21, 2009.

*Primary Examiner*—Patrick Ryan
*Assistant Examiner*—Karie O'Neill Apicella
(74) *Attorney, Agent, or Firm*—McDermott Will & Emery LLP

(57) ABSTRACT

An electrode plate includes a both-surface coated part 14 in which an electrode active material layer 13 is provided on both surfaces of a current collector core material 12, a core material exposed part 18 in which the negative electrode active material layer 13 is not provided, and a one-surface coated part 17 in which the negative electrode active material layer 13 is provided on only one surface of the current collector core material 12. A plurality of grooves 10 are formed in both surfaces of the both-surface coated part 14 and the grooves 10 are not formed in the one-surface coated part 17.

17 Claims, 10 Drawing Sheets

FOREIGN PATENT DOCUMENTS

| | | |
|---|---|---|
| JP | 11-154508 | 6/1999 |
| JP | 2000-067907 | 3/2000 |
| JP | 2000-173597 | 6/2000 |
| JP | 2001-023612 | 1/2001 |
| JP | 2001-222993 | 8/2001 |
| JP | 2001222993 A * | 8/2001 |
| JP | 2002-008709 | 1/2002 |
| JP | 2002-042789 | 2/2002 |
| JP | 2004-006275 | 1/2004 |
| JP | 2005-285607 | 10/2005 |
| JP | 2005285607 A * | 10/2005 |
| JP | 2006-012788 | 1/2006 |

* cited by examiner (a)

(b)

(c)

ELECTRODE PLATE FOR BATTERY, ELECTRODE GROUP FOR BATTERY, LITHIUM SECONDARY BATTERY, METHOD FOR PRODUCING ELECTRODE PLATE FOR BATTERY AND APPARATUS FOR PRODUCING ELECTRODE PLATE FOR BATTERY

RELATED APPLICATIONS

This application is the U.S. National Phase under 35 U.S.C. §371 of International Application No. PCT/JP2008/001944, filed on Jul. 22, 2008, which in turn claims the benefit of Japanese Application No. 2007-189334, filed on Jul. 20, 2007, Japanese Application No. 2007-203434, filed Aug. 3, 2007 and Japanese Application No. 2008-187405, filed Jul. 18, 2008 the disclosures of which Applications are incorporated by reference herein.

TECHNICAL FIELD

The present disclosure mainly relates to an electrode plate for a lithium secondary battery, a method for producing the electrode plate, an electrode group including the electrode plate, and a lithium secondary battery using the electrode group.

BACKGROUND ART

In recent years, lithium secondary batteries have been widely used as driving power supplies for mobile electronic devices and communication devices. In such a lithium secondary battery, in general, a carbon material capable of inserting and extracting lithium is used for a negative electrode plate and a composite oxide, such as $LiCoO_2$ or the like, containing transition metal and lithium is used for a positive electrode plate, thereby achieving a secondary battery with a high potential and a high discharge capacity. Now, with the development of electronic devices and communication devices having an increased range of functions, further increase in capacity is desired.

To realize a high capacity lithium secondary battery, for example, a volume of a positive electrode plate and a negative electrode plate occupying in a battery case is increased and an empty space other than a space between the electrode plates in the battery case is reduced. Thus, the capacity of the lithium battery can be further increased.

Moreover, for mixture pastes for positive and negative electrode plates, a mixture paste made of a material of a positive electrode plate or a negative electrode plate is applied onto a current collector core material and dried to form an active material layer and then, a high pressure is applied the active material by roll pressing to compress the active material to a predetermined thickness, thereby increasing a filling density. Thus, a further increase in capacity can be achieved.

When a filling density of an active material in each electrode plate is increased, it becomes difficult to impregnate a nonaqueous electrolyte with a relatively high viscosity, which has been injected into a battery case, into small gaps in an electrode group formed of positive and negative electrode plates stacked or spirally wound with a separator interposed therebetween with a high density. Therefore, it requires a long time to impregnate a predetermined amount of the nonaqueous electrolyte into the electrode group. Furthermore, with an increased filling density of the active material of each electrode plate, a porosity in each electrode plate is reduced and it is more difficult to impregnate the electrolyte thereinto.

Therefore, the ability of impregnating the electrode group with the nonaqueous electrolyte is further reduced and, as a result, the distribution of the nonaqueous electrolyte in the electrode group becomes nonuniform.

In Patent Document 1, a method in which electrolyte guiding grooves are formed in a surface of a negative electrode active material layer along a penetrating direction of the nonaqueous electrolyte to achieve proper impregnation of the nonaqueous electrolyte into an entire negative electrode is described. It should be noted that an impregnation time can be reduced by increasing width and depth of the grooves but, by doing so, an amount of the active material is reduced. This causes reduction in charge/discharge capacity and nonuniform reactions between electrode plates, so that a battery property is deteriorated. Therefore, taking this into consideration, the width and depth of the grooves are set to be predetermined values.

The grooves formed in the surface of the negative electrode active material layer might cause fractures of electrode plates when the electrode plates are wound to form an electrode group. Patent Document 2 discloses a method for improving impregnation while preventing fractures of electrode plates.

Specifically, grooves are formed in surfaces of electrode plates so that each of the grooves makes an angle with respect to a longitudinal direction of the electrode plate, thereby distributing tensile force applied in the longitudinal direction when the electrode plate is wound to form an electrode group. Thus, fractures of the electrode plates can be prevented.

In Patent Document 3, a method in which a porous film having convex portions partially formed on a surface thereof facing a positive electrode or a negative electrode is provided, not for the purpose of improving impregnation with an electrolyte but for the purpose of suppressing overheat caused by overcharge, is described. That is, a larger amount of a nonaqueous electrolyte is maintained in spaces formed between the convex portions of the porous film and an electrode plate than in other spaces to induce overcharge reaction in the spaces in a concentrated manner. By doing so, overcharge of a battery as a whole can be suppressed and overheat due to overcharge can be suppressed.

Patent Document 1: Japanese Published Patent Application No. 9-298057

Patent Document 2: Japanese Published Patent Application No. 11-154508

Patent Document 3: Japanese Published Patent Application No. 2006-12788

PROBLEMS WHICH THE INVENTION IS TO SOLVE

In winding a positive electrode plate and a negative electrode plate with a separator interposed therebetween to form an electrode group, the electrodes are wound with exposed parts thereof in which a current collector core material (current collector) with a current collector lead equipped is exposed, as a winding start end. Therefore, an active material layer at an innermost side of a core part of the formed electrode group is a useless part which does not contribute to any battery reaction. Because of this, at an end part of the core material (i.e., winding start part), an active material layer is formed on only one surface of the core material (and at other parts, the active material layer is formed on each of both surface of the core material), thereby eliminating the useless part which does not contribute any battery reaction. By doing so, a spatial volume in a battery case can be effectively used and thus a capacity of the battery is increased.

As a method for forming grooves in surfaces of an active material layers formed on both surfaces of an electrode plate, there is a method for forming grooves, in which a pair of rollers having a plurality of line projections formed on their surfaces are arranged on and under the electrode plate and then are rolled/moved while a pressure is applied onto each of both surfaces of the electrode plate by pressing the rollers against each of both surfaces. Using this method (which will be hereafter referred to as a "roll pressing"), a plurality of grooves can be simultaneously formed in each of both surfaces of an electrode plate. Therefore, this method is suitable for use in mass-production.

The present inventors examined various electrode plates in which grooves were formed on each of both surfaces thereof by roll pressing for the purpose of improving impregnation with an electrolyte and found the following problems.

FIGS. 10(a) through 10(c) are perspective views illustrating respective steps for producing an electrode plate 103. First, as shown in FIG. 10(a), an electrode plate hoop material 111 including both-surface coated parts 114 in which an active material layer 113 is formed on each of both surfaces of a belt-like current collector core material 112, one-surface coated parts 117 in which the active material layer 113 is formed on only one of the surfaces of the core material 112, and core material exposed parts 118 in which the active material layer 113 is not formed is provided. Next, as shown in FIG. 10(b), a plurality of grooves 110 are formed in a surface of each active material layer 113 by roll pressing and then, as shown in FIG. 10(c), the electrode plate hoop material 111 is cut at each of boundaries of the both-surface coated parts 114 and the core material exposed parts 118. Thereafter, a current collector lead 120 is spliced to the core material exposed part 118. Thus, the electrode plate 103 is produced.

However, as shown in FIG. 11, when the electrode plate hoop material 111 was cut at the boundaries of the both-surface coated parts 114 and the core material exposed parts 118, there arose a problem in which the core material exposed parts 118 and the one-surface coated parts 117 each being provided continuously from an associated one of the core material exposed parts 118 were largely deformed into a curved shape.

A reason for this was presumed that the grooves 110 were also formed in the surface of the active material layer 113 provided in each of the one-surface coated parts 117 continuously after formation of the grooves 110 in surfaces of the active material layers 113 provided on both surfaces of each of the both-surface coated parts 114, because roll pressing was performed while the electrode plate hoop material 111 was continuously passed through between the rollers. Specifically, when the active material layers 113 were rolled out by forming the grooves 110 therein, the active material layers 113 provided both surfaces thereof were rolled out in the same extent in the both-surface coated parts 114 but, in the one-surface coated parts 17, in contrast, the active material layer 113 was rolled out only at one surface of each of the one-surface coated parts 117. Thus, because of tensile stress of each active material layer 113, the one-surface coated parts 117 were largely deformed to curve to the side in which the active material layer 113 was not formed.

If an end part (including the core material exposed part 118 and the one-surface coated part 117 provided continuously from the core material exposed part 118) of the electrode plate 103 is deformed into a curved shape by cutting the electrode plate hoop material 111, a winding displacement might occur in winding the electrode plate 103 to form an electrode group. Moreover, also in the case where an electrode group is formed by stacking electrode plates, bending and the like might be caused. Furthermore, in transferring the electrode plate 103, there might be cases where the end part of the electrode plate 103 is not be securely chucked and, as a result, transferring the electrode plate 103 is failed or fall-off of an active material occurs. This might cause not only reduction in productivity but also reduction in reliability of batteries.

In view of the above-described problems, the present invention has been devised and provides an electrode plate for a battery, which exhibits excellent impregnation of an electrolyte and also has high productivity and reliability, and a lithium secondary battery using the electrode plate.

SOLUTION TO THE PROBLEMS

To solve the above-described problems, according to the disclosure of the present invention, in an electrode plate for a battery in which grooves are formed in both surfaces of a both-surface coated part, grooves are not formed in surfaces of a one-surface coated part. Thus, tensile stress due to an active material layer formed in the one-surface coated part is reduced, so that core material exposed part and the one-surface coated part each being provided continuously from the core material exposed part can be prevented from being largely deformed into a curved shape.

An electrode plate for a battery according to the present invention is an electrode plate for a battery, in which an active material layer is formed on a surface of a current collector core material, and is characterized that the electrode plate includes: a both-surface coated part in which the active material layer is formed on both surfaces of the current collector core material; a core material exposed part which is an end part of the current collector core material and in which the active material layer is not formed; and a one-surface coated part which is provided between the both-surface coated part and the core material exposed part and in which the active material layer is formed on only one of surfaces of the current collector core material, and a plurality of grooves are formed in both surfaces of the both-surface coated part and are not formed in the one-surface coated part.

In the above described configuration, the grooves are formed in the surfaces of the both-surface coated part but not in the surfaces of the one-surface coated part, and thus impregnation of an electrolyte is improved and also deformation of the core material exposed part and the one-surface coated part provided continuously from the core material exposed part in the electrode plate into a curved shape can be prevented. Accordingly, winding displacement caused when electrode plates are wound to form an electrode group or bending caused when electrode plates are stacked to form an electrode group can be prevented, and also troubles in transferring electrode plates or fall-off of an active material can be prevented. As a result, an electrode plate for a battery, which exhibits good impregnation of an electrolyte, good productivity and good reliability can be achieved.

In one preferred embodiment of the present invention, the grooves are formed in both surfaces of the both-surface coated part so that a phase of the grooves in one surface is symmetric with a phase of the grooves in the other surface.

The electrode plate is preferably a negative electrode plate. A depth of the grooves is preferably within a range of 4 μm to 20 μm. The grooves are preferably formed with a pitch of 100 μm to 200 μm along a longitudinal direction of the electrode plate. The grooves are preferably formed so that each of the grooves extends from one end to the other end of the electrode plate in a widthwise direction thereof. The grooves formed in the both surfaces of the both-surface coated part are preferably formed so as to be tilted at an angle of 30 degrees to 90 degrees from a longitudinal direction of the electrode plate so that a tilting direction of the grooves in one surface is different from a tilting direction of the grooves in the other surface and so as to intersect with one another at right angles in a grade separated crossing manner.

An electrode group for a battery according to the present invention is an electrode group for a battery, in which a positive electrode plate and a negative electrode plate are stacked or wound with a separator interposed therebetween, and is characterized in that at least one of the positive electrode plate and the negative electrode plate has the above-described configuration for an electrode plate for a battery, and the electrode group is wound with the core material exposed part of the electrode plate as a winding start end. When an electrode group is formed by stacking electrode plates, stacking of the electrode plates is started with a core material exposed part of an electrode plate as a stacking start end in the electrode group.

A lithium secondary battery according to the present invention is characterized in that the above-described electrode group is placed in a battery case, a predetermined amount of a nonaqueous electrolyte is injected, and an opening portion of the battery case is closely sealed.

A method for producing the electrode plate for a battery according to the present invention is a method for forming an electrode plate for a battery having the above-described configuration, and is characterized by including the steps of: a) preparing an electrode plate hoop material including a both-surface coated part in which an active material layer is provided on both surfaces of a current collector core material, a one-surface coated part in which the active material layer is provided on only one of surfaces of the current collector core material and a core material exposed part in which the active material layer is not provided, the both-surface coated part, the one-surface coated part and the core material exposed part being continuously formed in this order; b) rotating a pair of rollers each of which has a plurality of line projections formed on a surface thereof and which are arranged on and under the electrode plate hoop material with the pair of rollers pressed against both surfaces of the electrode plate hoop material to pass the electrode plate hoop material through a space between the pair of rollers, thereby simultaneously forming a plurality of grooves in both surfaces of the both-surface coated part; c) maintaining, after the both-surface coated part is passed through the space between the pair of rollers, the pair of rollers in a no pressure applied state for the one-surface coated part while the one-surface coated part is passed through the space between the pair of rollers; and d) cutting the negative electrode plate hoop material at the core material exposed part provided between the both-surface coated part and the one-surface coated part to divide the electrode plate hoop material into electrode plates for a battery.

In one preferred embodiment of the present invention, in the step (c), a conveying force for passing the electrode plate hoop material through the space between the pair of rollers is generated by a tension applied to the electrode plate hoop material.

In one preferred embodiment of the present invention, the pair of rollers are a fixed roller and a movable roller, in the step (b), grooves having a predetermined depth are formed in both surfaces of the both-surface coated part by rotating the movable roller with the movable roller pressed against a surface of the electrode plate hoop material by application of a constant pressure, and in the step (c), the movable roller is maintained in a no pressure applied state for the one-surface coated part and the electrode plate hoop material is put between the fixed roller and an auxiliary driving roller, thereby generating a conveying force for passing the electrode plate hoop material through the space between the pair of rollers. Note that the apparatus may be configured so that at least one of the pair of rollers is a movable roller.

An apparatus for producing an electrode plate for a battery according to the present invention, is an apparatus for producing an electrode plate for a battery having the above-described configuration and is characterized in that the apparatus including: a pair of rollers each of which has a plurality of line projections formed on a surface thereof; conveying force generating means for adding, to an electrode plate hoop material in which an active material layer is formed on the surfaces of a current collector core material, a conveying force for passing the electrode plate hoop material through the space between the pair of rollers; pressure adjusting means for adjusting a level of a pressure which the pair of rollers apply to the electrode plate hoop material; and distance adjusting means for adjusting a distance between the pair of rollers, wherein the electrode plate hoop material formed so that a both-surface coated part in which the active material layer is provided on both surfaces of a current collector core material, a one-surface coated part in which the active material layer is provided on only one of surfaces of the current collector core material and a core material exposed part in which the active material layer is not provided are continuously formed in this order is passed though the space between the pair of rollers and the rollers are rotated while being pressed against both surfaces of the negative electrode plate hoop material with application of a constant pressure adjusted by the pressure adjusting means to both surfaces of the electrode plate hoop material, thereby simultaneously forming a plurality of grooves in both surfaces of the both-surface coated part, and after the both-surface coated part is passed through the space between the pair of rollers, the pair of rollers are maintained in a no pressure applied state for the one-surface coated part by the distance adjusting means while the one-surface coated part is passed through the space between the pair of rollers.

In one preferred embodiment of the present invention, the pair of rollers are a fixed roller and a movable roller, the pressure adjusting means includes a mechanism for performing an adjustment so that the movable roller is rotated while pressing a surface of the electrode plate hoop material with a constant pressure, the distance adjusting means includes a stopper for preventing the movable roller from pressing the one-surface coated part while the one-surface coated part is passed through the space between the rollers, and the conveying force generating means includes a mechanism for generating a conveying force for passing the electrode plate hoop material through the space between the pair of rollers by putting the electrode plate hoop material between the fixed roller and a driving roller.

EFFECTS OF THE INVENTION

According to the disclosure of the present invention, in an electrode plate for a battery, in which grooves are formed in surfaces of a both-surface coated part, grooves are not formed in surfaces of a one-surface coated part. Thus, impregnation of an electrolyte is improved and also deformation of the core material exposed part and the one-surface coated part provided continuously from the core material exposed part in the electrode plate into a curved shape can be prevented. Accordingly, winding displacement caused when electrode plates are wound to form an electrode group or bending caused when electrode plates are stacked to form an electrode group can be prevented, and also troubles in transferring electrode plates or fall-off of an active material can be prevented. As a result, an electrode plate for a battery, which exhibits good impregnation of an electrolyte, good productivity and good reliability can be achieved.

BRIEF DESCRIPTION OF THE DRAWINGS

FIG. 8(a) is a longitudinal cross-sectional view; FIG. 8(b) is a cross-sectional view taken along the line B-B; and FIG. 8(c) is a cross-sectional view of a projection for groove processing.

EXPLANATION OF REFERENCE NUMERALS

Figure 1:
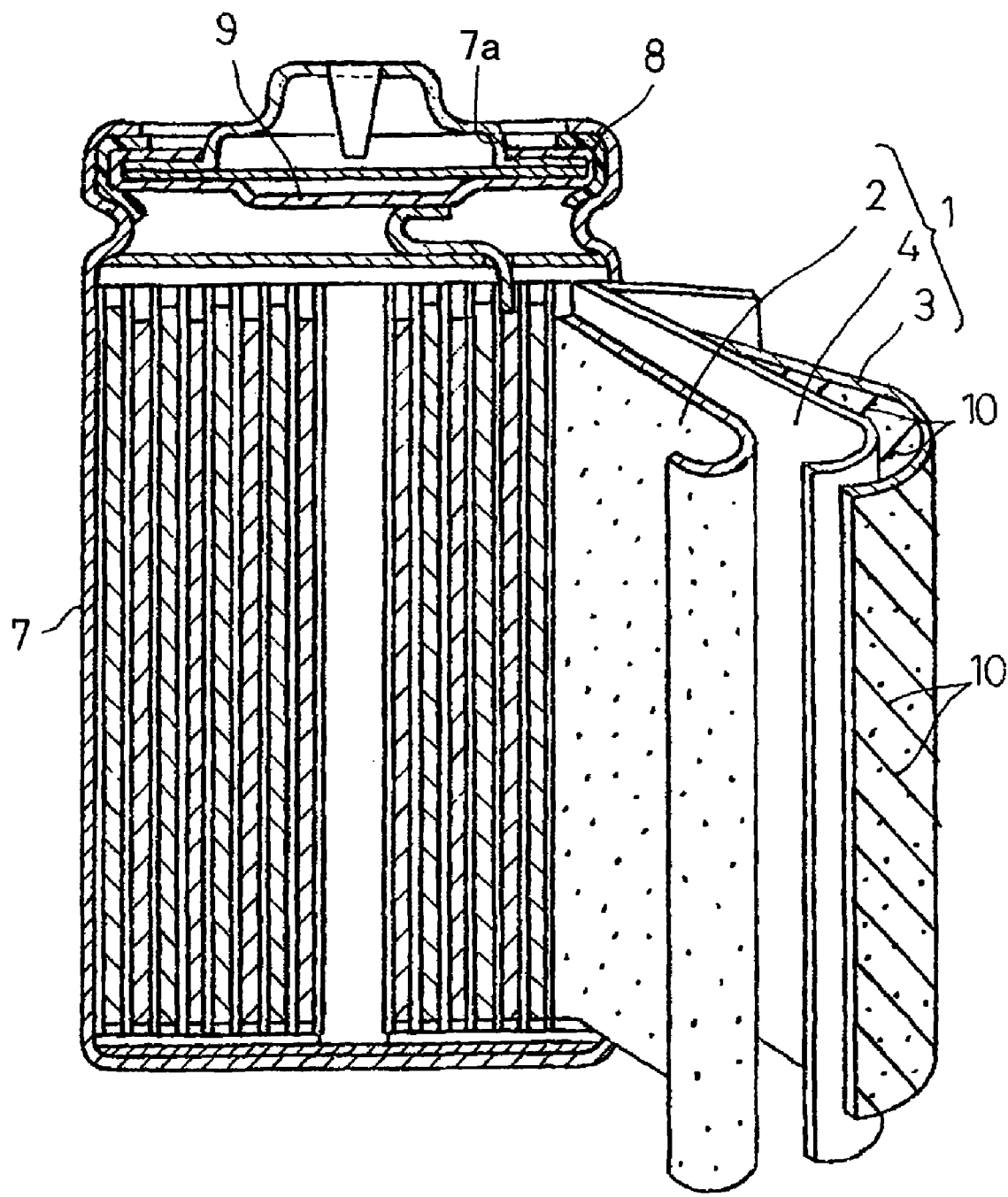
FIG. 1 is a cross-sectional view illustrating a configuration of a lithium secondary battery according to a first embodiment of the present invention.

| | |
|---|---|
| 1 | Electrode group |
| 2 | Positive electrode plate |
| 3 | Negative electrode plate |
| 4 | Separator |
| 7 | Battery case |
| 8 | Gasket |
| 9 | Sealing plate |
| 10 | Grooves |
| 11 | Negative electrode plate hoop material |
| 12 | Current collector core material |
| 13 | Negative electrode active material layer |
| 14 | Both-surface coated part |
| 17 | One-surface coated part |
| 18 | Core material exposed part |
| 19 | Electrode plate component part |
| 20 | Current collector lead |
| 21 | Insulation tape |
| 22 | Uncoiler |
| 24, 37 | Dancer roller mechanism |
| 27 | Meandering preventing roller mechanism |
| 28 | Groove processing mechanical section |
| 29 | Supply side winding guide roller |
| 30 | Fixed side groove processing roller (fixed roller) |
| 31 | Movable side groove processing roller (movable roller) |
| 30a, 31a | Groove processing line projections |
| 30b, 31b | Roller axis |
| 32 | Auxiliary driving roller |
| 33 | Output side winding guide roller |
| 34 | Direction change guide roller |
| 43, 44 | Gear |
| 47, 48 | Ball bearing |
| 49 | Stopper |
| 50, 51 | Air cylinder |
| 52, 53 | Air pipe |
| 54 | Precision decompression valve |
| 59 through 62 | Dust collection nozzle |

BEST MODE FOR CARRYING OUT THE INVENTION

Hereinafter, embodiments of the present invention will be described with reference to the accompanied drawings. In the drawings, each component having substantially the same function is identified by the same reference numeral for simplification. Note that the present invention is not limited to the following embodiments.

First Embodiment

FIG. 1 is a cross-sectional view schematically illustrating a lithium secondary battery according to a first embodiment of the present invention. In the lithium secondary battery, a positive electrode plate 2 including composite lithium oxide as an active material and a negative electrode plate 3 including a material capable of containing lithium are spirally wound with a separator 4 interposed therebetween to form an electrode group 1. The electrode group 1 is placed in a cylindrical battery case 7 with a bottom, and a predetermined amount of an electrolyte (not shown) of a nonaqueous solvent is injected into the battery case 7 so as to be impregnated into the electrode group 1. An opening portion of the battery case 7 is bent inwardly in a radial direction and cramped with a sealing plate 9 having a gasket 8 at a circumference edge thereof inserted therein, thereby closely sealing the battery case 7. In the lithium secondary battery, a plurality of grooves 10 are formed on both surfaces of the negative electrode plate 3 so as to intersect with one another at right angles in a grade separated crossing manner. By impregnating an electrolyte through the grooves 10, impregnation of the electrolyte into the electrode group 1 is improved.

Figure 2:
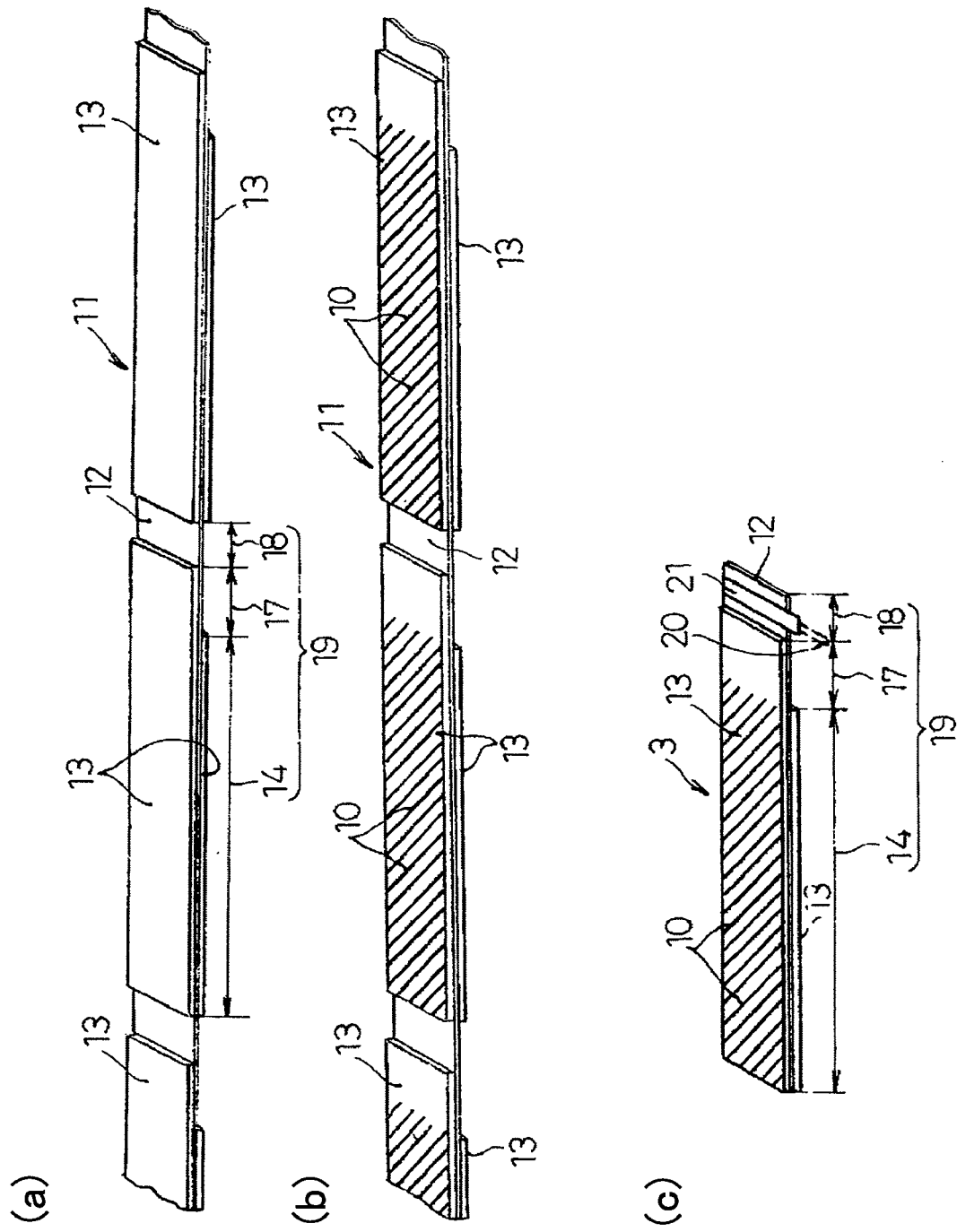
FIGS. 2(a) through 2(c) are perspective views illustrating respective steps for producing an electrode plate for a battery according to the first embodiment of the present invention.

FIGS. 2(a) through 2(c) are perspective views illustrating respective steps for producing the electrode plate 3. FIG. 2(a) illustrates a negative electrode plate hoop material 11 before being divided into negative electrode plates 3. The negative electrode plate hoop material 11 is obtained in the following manner. A negative electrode mixture paste is applied to both surfaces of a current collector core material 12 of a long strip shaped copper foil having a thickness of 10 μm and is dried, and then the current collector core material 12 is compressed by roll pressing so that a total thickness thereof is 200 μm, thereby obtaining a negative electrode active material layer 13. Then, the negative electrode active material layer 13 is subjected to slitter operation so as to have a width of about 60 mm. In this case, as the negative electrode mixture paste, for example, a paste obtained by mixing artificial graphite as an active material, styrene-butadiene copolymer rubber particle dispersant as a binder, and carboxymethyl cellulose as a thickener with an adequate amount of water is used.

In the negative electrode plate hoop material 11, a both-surface coated part 14 in which the negative electrode active material layer 13 is formed on both of the surfaces of the current collector core material (which will be hereinafter referred to as merely "core material") 12, a one-surface coated part 17 in which the negative electrode active material layer 13 is formed only on one of the surfaces of the current collector core material 12 and a core material exposed part 18 in which the negative electrode active material layer 13 is not formed on the current collector core material 12 together form an electrode plate component part 19, and a plurality of electrode plate component parts 19 are consecutively provided in a longitudinal direction of the negative electrode plate hoop material 11. Note that the electrode plate component parts 19 in which the negative electrode active material layer 13 is partially provided can be formed in a simple manner by applying the negative electrode active material layer 13 thereto by a known intermittent material application method.

FIG. 2(b) illustrates a state of the negative electrode plate hoop material 11 where grooves 10 are not formed in the negative electrode active material layers 13 in the one-surface coated parts 17 and are formed only in the negative electrode active material layers 13 provided in both surfaces of each of the both-surface coated parts 14.

After the negative electrode plate hoop material 11 in which the grooves 10 are formed is cut at each core material exposed parts 18 each being located adjacent to an associated one of the both-surface coated parts 14 by a cutter, as shown in FIG. 2(c), so as to be divided into the electrode plate component parts 19, a current collector lead 20 is welded to be attached to the core material 12 of each of the core material exposed parts 18, and then coating of the current collector lead 20 with an insulation tape 21 is performed. Thus, the negative electrode plate 3 of a lithium secondary battery is produced.

Note that in this embodiment, the case where the grooves 10 are formed in the both-surface coated parts 14 of the negative electrode plate 3 is described as an example. However, the grooves 10 may be formed in surfaces of positive electrode active material layers provided in both-surface coated part of the positive electrode plate 2. In general, when the grooves 10 are formed in the negative electrode plate 3 that is less hard than the positive electrode plate 2, the grooves 10 can be formed with application of a smaller pressure and increase in the thickness of the negative electrode active material layer 13 or expansion of the negative electrode active material layer 13 are hardly caused. Therefore, advantageously, large change in specification is not necessary. Moreover, in the case where the grooves 10 are formed in the positive electrode material layers provided in the both-surface coated part of the positive electrode plate 2, even when a large pressure is applied to the relatively hard positive electrode active material layers provided on both surfaces of the both-surface coated part to form grooves, deformation of the electrode plate into a curved shape can be effectively suppressed because grooves are not formed in one-surface coated parts.

By forming the negative electrode plate 3 so as to have the above-described configuration, the following effects can be achieved.

When the negative electrode plate 3 and the positive electrode plate 2 are spirally wound with the separator 4 interposed therebetween to form the electrode group 1, winding starts with the core material exposed part 18 to which the current collector lead 20 is attached as a winding start edge. In this case, a surface of the one-surface coated parts 17 of the negative electrode plate 3 on which the negative electrode active material layer 13 does not exist is placed to be an inner surface in a center part of the electrode group 1 having the above-described wound configuration. The inner surface of the one-surface coated part 17 is a part which does not contribute to battery reaction when those components function as a battery. Thus, when unnecessary formation of the negative electrode active material layer 13 in the part is avoided, a spatial volume in the battery case 7 can be effectively used and a capacity as a battery can be increased accordingly.

Moreover, since the grooves 10 are not formed in the negative electrode active material layer 13 provided in the one-surface coated part 17, large deformation of the core material exposed part 18 and the one-surface coated part 17 formed continuously from the core material exposed part 18 into a curved shape can be prevented. Thus, winding displacement caused in forming the electrode group by winding the positive electrode plate 2 and the negative electrode plate 3 can be prevented in the step shown in FIG. 2(c) for cutting the negative electrode plate hoop material 11. Moreover, when the negative electrode plate 3 is wound by a winding device, a trouble such as a failure of chucking of an end part (core material exposed part) of the negative electrode plate 3 and fall-off of the negative active material can be prevented. As a result, an electrode plate for a battery having a good impregnation of an electrolyte and also excellent productivity and reliability can be achieved.

Figure 3:
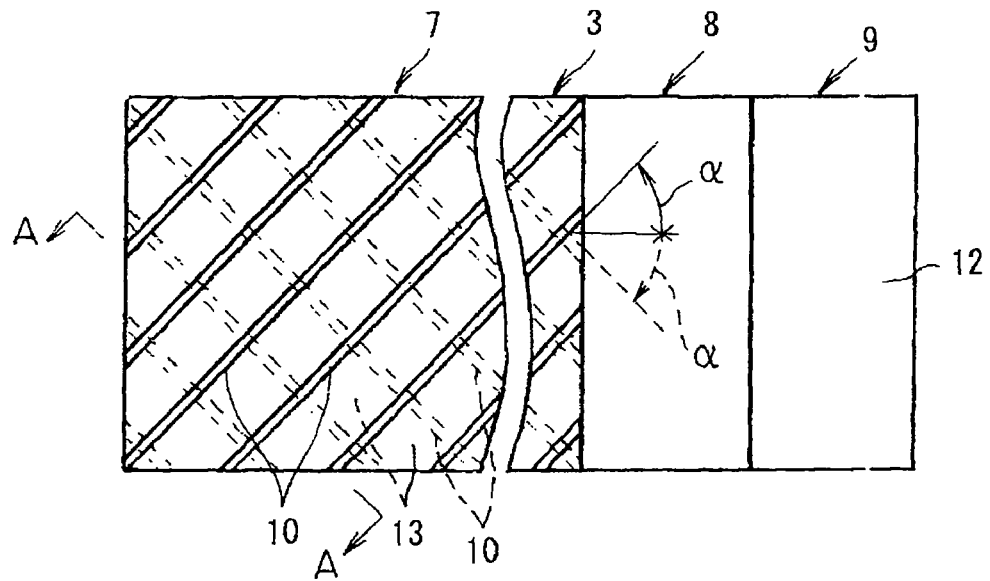
FIG. 3 is a partially enlarged plan view of the electrode plate of the first embodiment of the present invention.

FIG. 3 is an enlarged partial plan view of the negative electrode plate 3 of this embodiment. The grooves 10 in the negative electrode active material layers 13 provided in both surfaces of each of the both-surface coated parts 14 are formed so as to be tilted at an angle α of 45 degrees from a longitudinal direction of the negative electrode plate 3 so that the tilting direction of the grooves 10 in one surface is different from that in the other surface and the grooves 10 intersect with one another at right angles in a grade separated crossing manner. Also, the grooves 10 in the same surface are formed with a constant pitch so as to be arranged in parallel with one another, and each of the grooves 10 extends from one end to another end of the negative electrode active material layer 13 in the widthwise direction (i.e., a perpendicular direction to the longitudinal direction). Effects of this arrangement of the grooves 10 in the negative electrode plate 3 will be described later.

Figure 4:
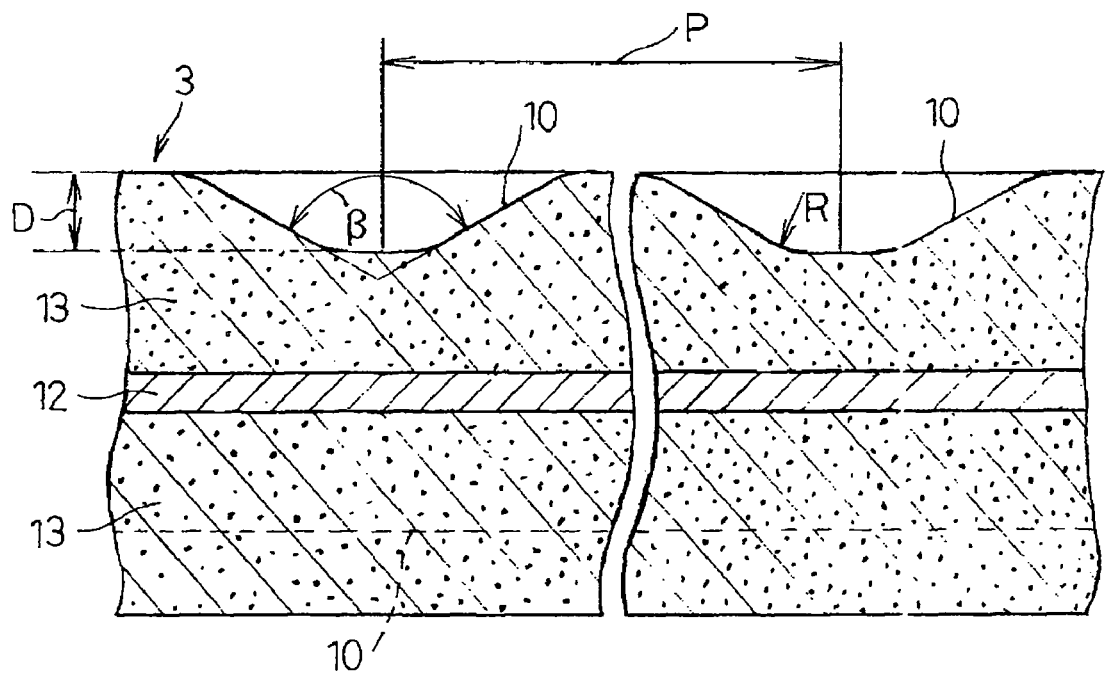
FIG. 4 is an enlarged cross-sectional view taken along the line A-A of FIG. 3.

FIG. 4 is an enlarged cross-sectional view taken along the line A-A of FIG. 3 and illustrates cross sectional shape and arrangement pattern of the grooves 10. The grooves 10 are formed with a pitch P of 170 μm in both surfaces of the both-surface coated part 14. Moreover, the grooves 10 are formed so that a cross section of each groove 10 has an inverted trapezoid shape. A depth D of each groove 10 of this embodiment is 8 μm, each of both side walls of each groove 10 is tilted at an angle β of 120 degrees, and a groove bottom corner part which is a boundary between a bottom surface and each of the walls of each groove 10 has an arc shape with a curvature of 30 μm.

In this embodiment, the case where the pitch P of the grooves 10 is 170 μm and the depth D of the grooves 10 is 8 μm is described as an example. However, the pitch P may be set within a range of 100 μm or more and 200 μm or less. Also, the depth D of the grooves 10 may be set to be within a range of 4 μm or more and 20 μm or less. The depth D is more preferably set to be within a range of 5-15 μm, and even more preferably within a range of 6-10 μm. A reason for this setting will be later described in detail.

Next, a method for forming the grooves 10 in surfaces of the both-surface coated parts 14 will be described with reference to FIG. 5.

Figure 5:
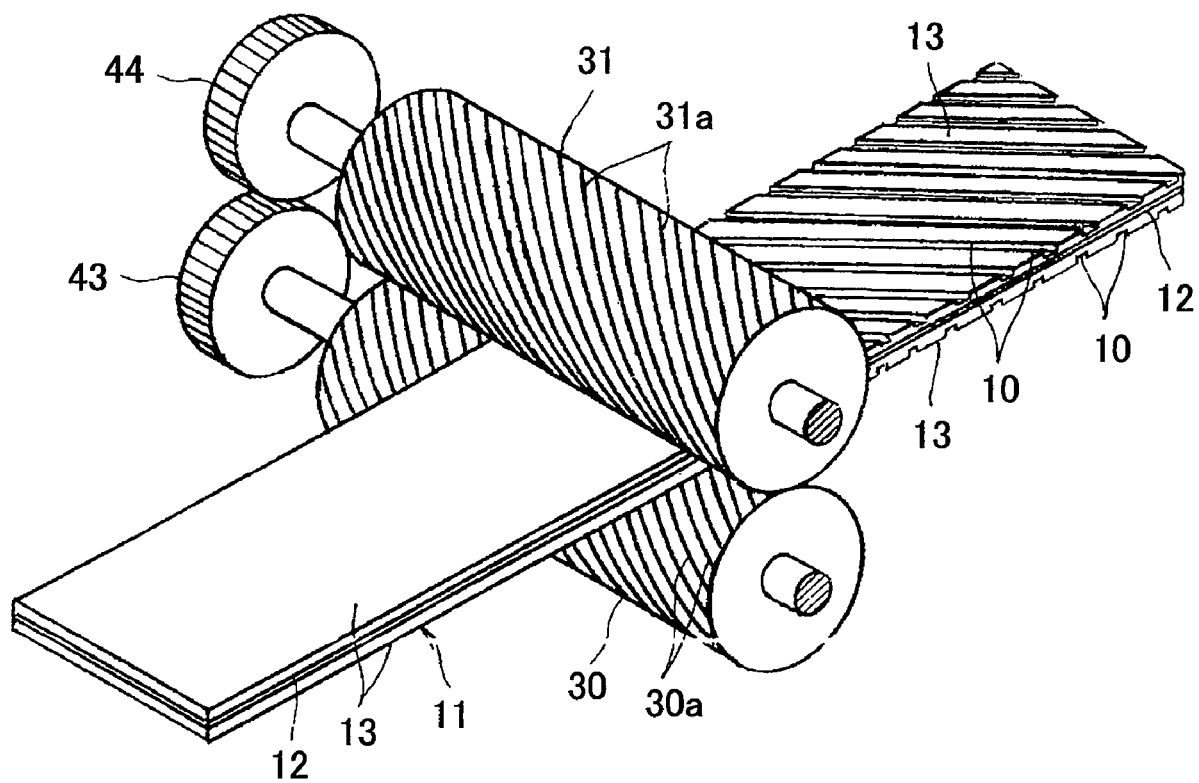
FIG. 5 is a perspective view illustrating a method for forming grooves in a both-surface coated part according the first embodiment of the present invention.

As shown in FIG. 5, a pair of groove processing rollers 31 and 30 are arranged with a predetermined space therebetween, and the negative electrode plate hoop material 11 shown in FIG. 2(a) is passed through between the groove processing rollers 31 and 30, so that grooves 10 each having a predetermined shape can be formed in the negative electrode active material layers 13 provided in both surfaces of each of the both-surface coated parts 14 in the negative electrode plate hoop material 11.

The groove processing rollers 31 and 30 are identical to each other and include a plurality of groove processing line projections 31a and 30a formed so that each of them makes an angle of 45 degrees with respect to an axis direction. The groove processing line projections 31a and 30a can be formed easily with high accuracy by thermal spraying of chrome oxide onto an entire surface of an iron roller body to coat the iron roller body, thereby forming a ceramic layer, and then irradiating the ceramic layer with a laser to partially melt the ceramic layer so that a predetermined pattern is made. The groove processing rollers 31 and 30 are substantially the same as a so-called ceramic laser engraved roll which is generally used for printing. As described above, the groove processing rollers 31 and 30 are formed of chrome oxide, so that each roller has a pretty large hardness, i.e., a hardness of HV1150 or more. Therefore, each of the groove processing rollers 31 and 30 has high resistance to sliding and wearing and a lifetime several ten times that of an iron roller can be ensured.

As has been described, the negative electrode plate hoop material 11 is passed through a space between the groove processing rollers 31 and 30 in which the plurality of groove processing line projections 31a and 30a are formed. Thus, as shown in FIG. 3, the grooves 10 can be formed in the negative electrode active material layers 13 provided in both surfaces of each of the both-surface coated parts 14 in the negative electrode plate hoop material 11 so that the grooves 10 intersect with one another at right angles in a grade separated crossing manner.

Note that the groove processing line projections 31a and 30a each have a cross-sectional shape which can form the grooves 10 with the cross-sectional shape shown in FIG. 4. Specifically, the cross-sectional shape has a circular arc end section having an angle $\beta$ of 120 degrees and a curvature R of 30 μm. A reason why the angle $\beta$ of the end section is set to be 120 degrees is that if it is set to be a small angle, i.e., an smaller angle than 120 degrees, the ceramic layer becomes easy to be damaged. Also, the curvature R of the end section is set to be 30 μm is for the purpose of preventing the occurrence of cracks in the negative electrode active material layer 13 when the line projections 31a and 30a are pressed against the negative electrode active material layer 13 for forming the grooves 10. The height of the line projections 31a and 30a is set to be about 20-30 μm because the most preferable range of the depth D of the grooves 10 is 6-10 μm. If the height of the line projections 31a and 30a is too low, a negative electrode material, stripped from the negative electrode active material layer 13 when circumferential surfaces of the line projections 31a and 30a are brought in contact with the negative electrode active material layer 13, is attached to the circumferential surfaces of the groove processing rollers 31 and 30. It is therefore required to set the height of the line projections 31a and 30a to be larger than the depth D of the grooves 10 to be formed.

Rotation of each of the groove processing rollers 31 and 30 will be described. Rotating force generated by a servomotor or the like is transmitted to one of the groove processing rollers 31 and 30, i.e., the groove processing roller 30, rotation force of the groove processing roller 30 is transmitted to the other roller, i.e., the groove processing roller 31 via a pair of gears 44 and 43 pivotally attached to roller axes of the groove processing rollers 31 and 30, respectively, and meshed with each other, and thereby the groove processing rollers 31 and 30 are rotated at the same rotation speed.

As a method of forming the grooves 10 by embedding the groove processing line projections 31a and 30a of the groove processing rollers 31 and 30 in the negative electrode active material layer 13, there are a constant dimension method in which the depth D of the grooves 10 is set to be formed according to a gap between the groove processing rollers 31 and 30, and a constant pressure method in which using the correlation between a pressure applied to the line projections 31a and 30a and the depth D of the grooves 10, the groove processing roller (which will be hereinafter referred to as a "fixed roller") 30 to which rotation force is transmitted is fixed and a pressure to be applied to the groove processing roller (which will be hereinafter referred to as a "movable roller") 31 provided so as to be capable of moving up and down is adjusted to determine the depth D of the grooves 10 to be formed. The constant pressure method is preferably used for forming grooves according to this embodiment.

A reason why the constant pressure method is preferable is as follows. If the constant dimension method is used, it is difficult to precisely set a gap between the groove processing rollers 31 and 30 in micrometer scale. In addition, the axis deflection of each of the groove processing rollers 31 and 30 directly affects the depth D of the grooves 10. In contrast, if the constant pressure method is used, those problems can be easily coped with, even though there is slight influence by a filling density of an active material in the negative electrode active material layer 13, by automatically performing variable adjustment to variations of thickness of the both-surface coated part 14 so that a pressure to be applied to press the roller 31 (e.g., an air pressure of an air cylinder) is kept constant. Thus, the grooves 10 each having a predetermined depth D can be formed with high reproducibility.

However, when the grooves 10 are formed using the constant pressure method, the negative electrode plate hoop material 11 has to be passed through the space between the groove processing rollers 31 and 30 without forming the grooves 10 in the negative electrode active material layer 13 provided in the one-surface coated part 17 of the negative electrode plate hoop material 11. To achieve this, stoppers can be provided between the groove processing rollers 31 and 30 to keep the movable roller 31 in a no pressure applied state for the one-surface coated part 17. Herein, the "no pressure applied state" is a state (including a no contact state as well) in which the movable roller 31 is in contact with the one-surface coated part so that grooves are not formed in the one-surface coated part.

When the negative electrode plate 3 has a small thickness and the thickness of the both-surface coated part 14 is only about 200 μm, process accuracy for forming grooves has to be increased in forming the grooves 10 having a depth D of 8 μm in the both-surface coated part 14 having such a small thickness. To achieve high process accuracy, bearing parts of the groove processing rollers 31 and 30 are preferably formed so that only a necessary gap for a bearing to rotate is provided in each of the bearing parts of the groove processing rollers 31 and 30, each roller axis and associated ones of bearings are arranged to fit with each other without a gap therebetween, and each bearing and a bearing holder for holding the bearing are arranged to fit with each other without a gap therebetween. Thus, the negative electrode plate hoop material 11 can be smoothly passed through the gap between the groove processing rollers 31 and 30 without bumping. Therefore, the negative electrode plate hoop material 11 can be passed through the space therebetween, while forming the grooves 10 in the negative electrode active material layers 13 provided in both surfaces of the both-surface coated part 14 but not forming the grooves 10 in the negative electrode active material layer 13 provided in the one-surface coated part 17.

Next, the depth D of the grooves 10 will be described. An electrolyte injection property (impregnation) for injecting an electrolyte into the electrode group 1 is improved as the depth D of the grooves 10 is increased. To examine this, three types of negative electrode plates 3 in which the grooves 10 were formed with a pitch P of 170 µm in the negative electrode active material layers 13 in the both-surface coated part 14 were formed. The respective depths D of the grooves 10 in the three types of negative electrode plates 3 were 3 µm, 8 µm and 25 µm. Each of the negative electrode plates 3 and the positive electrode plate 2 were wound with the separator 4 interposed between the positive electrode plate 2 and the negative electrode plate 3, so that three types of electrode groups 1 were formed. The electrode groups 1 were placed respectively in battery cases, and comparison in electrolyte injection time which it takes for an electrolyte to penetrate in each electrode group 1 was made between the electrode groups 1. As a result, the electrolyte injection time was about 45 minutes for the negative electrode plate 3 in which the depth D of the grooves 10 was 3 µm, the electrolyte injection time was about 23 minutes for the negative electrode plate 3 in which the depth D of the grooves 10 was 8 µm, and the electrolyte injection time was about 15 minutes for the negative electrode plate 3 in which the depth D of the grooves 10 was 25 µm. It was clearly shown that as the depth D of the grooves 10 was increased, the electrolyte injection property into the electrode group 1 was improved and, when the depth D of the grooves 10 was reduced to a depth smaller than 4 µm, the effect of improving the electrolyte injection property was hardly achieved.

When the depth D of the grooves 10 is increased, the electrolyte injection property is improved. However, an active material of the negative electrode plates 3 is abnormally compressed in parts thereof in which the grooves 10 are formed, so that lithium ions can not freely move. Accordingly, lithium ion receiving property is deteriorated, so that lithium metal might be easily deposited. Moreover, when the depth D of the grooves 10 is large, the thickness of the negative electrode plate 3 is also increased accordingly and also further expansion of the negative electrode plate 3 is caused, and thus the active material is easily peeled off. Furthermore, when the thickness of the negative electrode plate 3 is increased, troubles in production are caused. For example, the active material is peeled off from a core material 12 in the winding step in which the electrode group 1 is formed, the electrode group 1 with an increased diameter according to the increase in thickness of the negative electrode plate 3 rubs against end part of an opening portion of the battery case 7 and is difficult to be inserted, or like problems occur. In addition, in a state where the active material is easily peeled off from the core material 12, the conductivity is reduced and battery properties are reduced.

It is considered that the peel resistant strength for peeling of the active material from the core material 12 is reduced as the depth D of the grooves 10 is increased. That is, as the depth D of the grooves 10 is increased, the thickness of the negative electrode active material layer 13 is increased, i.e., the thickness of the negative electrode active material layer 13 is increased, large force is applied in a direction, which causes the active material to be peeled off from the core material 12. Thus, the peel resistant strength is reduced.

To examine this, four types of negative electrode plates 3 in which the grooves 10 were formed at a pitch P of 170 µm were formed. The depths D of the grooves 10 in the four types of negative electrode plates 3 were 25 µm, 12 µm, 8 µm and 3 µm. A peel resistant strength test was performed to the negative electrode plates 3. The results of the test showed that the peel resistant strengths of the negative electrode plates 3 in decreasing order of the depth D were about 4 (N/m), about 5 (N/m), about 6 (N/m) and about 7 (N/m). It was thus confirmed from the results that as the depth D of the grooves 10 is increased, the peel resistant strength is reduced.

Based on what has been described above, the following is confirmed regarding the depth D of the grooves 10. That is, when the depth D of the grooves 10 is set to be smaller than 4 µm, the electrolyte injection property (impregnation) is insufficient and, on the other hand, when the depth D of the grooves 10 is set to be larger than 20 µm, the peel resistant strength for peel-off of the active material from the core material 12 is reduced. Thus, reduction in battery capacity might be caused and also the active material which has been fallen off might go through the separator 4 to be in contact with the positive electrode plate 2, thereby causing an internal short circuit. Therefore, by forming the grooves 10 so that the depth D thereof is as small as possible and the number of the grooves 10 is increased, the above-described problems can be prevented and a good electrolyte injection property can be achieved. To obtain this configuration, it is necessary to set the depth D of the grooves 10 to be within a range of 4 µm or more and 20 µm or less, and it is preferable to set it to be within a range of 5-15 µm and more preferable to set to be within a range of 6-10 µm.

Next, the pitch P of the grooves 10 will be described. When the pitch P of the grooves 10 is smaller, the number of the grooves 10 is increased and a total cross-section area of the grooves 10 is increased, so that the electrolyte injection property can be improved. To examine this, three types of the negative electrode plates 3 in which the grooves 10 having a depth D of 8 µm were formed with different pitches were prepared. The pitches P in the three different types of negative electrode plates 3 were 80 µm, 170 µm and 260 µm. Three types of electrode groups 1 respectively including the three types of negative electrode plates 3 were placed in battery cases 7, respectively, and comparison in the electrolyte injection time was made between the electrode groups 1. As a result, the electrolyte injection time was about 20 minutes when the pitch P was 8 µm, the electrolyte injection time was about 23 minutes when the pitch P was 170 µm, and the electrolyte injection time was about 30 minutes when the pitch P was 260 µm. It was clearly shown that as the pitch P of the grooves 10 is reduced, the electrolyte injection property into the electrode group is improved.

When the pitch P of the grooves 10 is set to be smaller than 100 µm, the electrolyte injection property is improved. However, parts of the negative electrode active material layer 13 which are compressed by a large number of the grooves 10 are increased and the filling density of the active material is increased too much. Also, flat part of the surface of the negative electrode active material layer 13 in which the grooves 10 do not exist is reduced too much, so that part between adjacent ones of the grooves 10 has a line projection shape that can be easily crushed. If this line projection shape is crushed when the negative electrode plate 3 is chucked in a transferring process, there arises a problem in which the thickness of the negative electrode active material layer 13 varies.

On the other hand, when the pitch P of the grooves 10 is set to be larger than 200 µm, expansion of the core material 12 occurs and a large stress is applied to the negative electrode active material layer 13. Also, the peel resistant strength for peel-off of the active material from the core material 12 is reduced so that fall-off of the active material is easily caused.

Hereafter, reduction in peel resistant strength caused when the pitch P of the grooves 10 is increased will be described.

When the negative electrode plate hoop material 11 is passed through between the identical groove processing rollers 31 and 30 and the line projections 31a and 30a of the groove processing rollers 31 and 30 are embedded into the negative electrode active material layer 13 in the both-surface coated parts 14 and the grooves 10 are formed simultaneously in both surfaces of the both-surface coated parts 14, loads of the line projections 31a and 30a are simultaneously applied to the same location and thus are cancelled off only in parts where the line projections 31a and 30a intersect with one another at right angles in a grade separated crossing manner, in other words, where the grooves 10 formed in both surfaces of each of the both-surface coated parts 14 intersect with one another at right angles in a grade separated crossing manner. In other parts, only the core material 12 receives loads applied by the line projections 31a and 30a. Therefore, in the case where the grooves 10 in the both-surface coated parts 14 are formed to intersect with one another at right angles, when the pitch P of the grooves 10 is large, a span at which the core material 12 receives loads applied by the line projections 31a and 30a is increased and thus a burden on the core material 12 is increased. Accordingly, the core material 12 is expanded and, as a result, the active material is peeled off in the negative electrode active material layers 13 or the active material is peeled off from the core material 12. That is, the peel resistant strength of the negative electrode active material layers 13 with respect to the core material 12 is reduced.

To confirm that as the pitch P of the grooves 10 is increased, the peel resistant strength is reduced, four types of the negative electrode plates 3 in which the grooves 10 having a depth D of 8 µm were formed with different pitches were prepared. The pitches P in the four different types of negative electrode plates 3 were 460 µm, 260 µm, 170 µm and 80 µm, and a peel resistant test was performed to the negative electrode plates 3. As a results, the peel resistance strengths for the four types of negative electrode plates 3 in decreasing order of their pitch P were about 4 (N/m), about 4.5 (N/m), about 5 (N/m) and about 6 (N/m). It was confirmed that as the pitch P of the grooves 10 was increased, the peel resistant strength was reduced and the active material was easily fallen off.

Furthermore, after forming the grooves 10, cross-sections of the negative electrode plates 3 were observed. Then, it was found that in the negative electrode plate 3 in which the grooves 10 were formed with a long pitch P, i.e., 260 µmm, the core material 12 was bent and part of the active material was slightly peeled off from the core material 12.

Based on what has been described above, the pitch P of the grooves 10 is preferably set to be within a range of 100 µm or more and 200 µm or less.

Since the grooves 10 are formed so as to intersect with one another in a grade separated crossing manner in the both-surface coated part 14, distortions generated in the negative electrode active material layers 13 in one surface and the other surface when the line projections 31a and 30a are embedded into the negative electrode active material layers 13 are advantageously cancelled out with one another. Furthermore, when the grooves 10 are formed with a constant pitch P, a distance between parts of the grooves 10 at adjacent intersections is the smallest. Accordingly, only a small burden is put on the core material 12 and the peel resistant strength for peel-off of the active material from the core material 12 is increased, so that fall-off of the active material can be effectively prevented.

Moreover, the grooves 10 are formed in the both-surface coated part 14 so as to form a pattern in which phases thereof in both surfaces are symmetric. Therefore, expansion of each of the negative electrode active material layers 13 caused by forming the grooves 10 occurs in the negative electrode active material layers 13 in both surfaces of the both-surface coated part 14 in an equal manner, and thus distortions do not exist after the grooves 10 are formed.

Furthermore, since the grooves 10 are formed in both surfaces of the both-surface coated part 14, a large amount of electrolyte can be evenly maintained, compared to the case where the grooves 10 are formed only in one surface, so that a long cycle life can be ensured.

To examine this, an observation was conducted in the following manner. A negative electrode plate 3 in which the grooves 10 having a depth D of 8 µm were formed with a pitch P of 170 µm in both surfaces of the both-surface coated part 14, a negative electrode plate 3 in which the grooves 10 having a depth D of 8 µm were formed with a pitch of 170 µm in one surface of the both-surface coated part 14, a negative electrode plate 3 in which the grooves 10 were not formed in both surfaces were prepared. Then, several batteries were formed for each of the battery configurations which respectively include three types of electrode groups 1 formed by using the three types of negative electrode plates 3 and then placing them in battery cases 7, respectively. A predetermined amount of an electrolyte was injected into each of the battery cases and impregnated thereinto under vacuum. Thereafter, each of the electrode groups placed in the battery cases was decomposed and an impregnation state of the negative electrode plate 3 with the electrolyte was observed.

As a result, immediately after the electrolyte was injected, the area of the negative electrode plate 3 in which the electrolyte was impregnated was only 60% of the total area in the negative electrode plate 3 in which the grooves 10 were not formed in the both surfaces. In the negative electrode plate 3 in which the grooves 10 were formed only at one of the both surfaces, the electrolyte injected area was 100% of the total area in the surface in which the grooves 10 were formed and was about 80% of the total area in the surface in which the grooves 10 were note formed. In contrast, in the negative electrode plate 3 in which the grooves 10 were formed in the both surfaces, the electrolyte injected area in which the electrolyte was impregnated was 100% of the total area in the both surfaces.

Next, after the injection of the electrolyte was completed, to examine how much time is required for impregnation of the electrolyte into the entire negative electrode plate 3, one battery was decomposed every hour and observed. As a results, in the negative electrode plate 3 in which the grooves 10 were formed in the both surfaces, the electrolyte was impregnated at 100% in the both surfaces immediately after injection of the electrolyte and, in contrast, in the negative electrode plate 3 in which the grooves 10 were formed in only one surface, the electrolyte was impregnated at 100% after a lapse of 2 hours in the surface in which the grooves 10 were not formed. In the negative electrode plate 3 in which the grooves 10 were not formed, the electrolyte was impregnated at 100% at a lapse of 5 hours at the both surfaces. In this negative electrode plate 3, the amount of impregnation of the electrolyte was small in parts which were impregnated with the electrolyte immediately after injection of the electrolyte, and the distribution of the electrolyte was nonuniform. Thus, from the results, it is confirmed that when the depths D of the grooves 10 are all the same, in the negative electrode plate 3 in which the grooves 10 are formed in the both surfaces, time which it takes to complete impregnation of the electrolyte can be reduced to about ½ of that in the negative electrode plate 3 in which the grooves 10 are formed only at one surface, and also a cycle life as a battery can be increased.

Furthermore, batteries under cycle tests were decomposed to examine a distribution of the electrolyte in the electrode plate in which the grooves 10 were formed in only one surface, and thereby the cycle life of the batteries was examined, based on how much EC (ethylene carbonate) which was a major component of a nonaqueous electrolyte was extracted per unit area of the electrode plate. As a result, in each of the batteries, regardless of sampling parts, EC existing in the surface in which the grooves 10 were formed was larger than that in the surface in which the grooves 10 were not formed by about 0.1-0.15 mg. That is, when the grooves 10 are formed in the both surfaces, the amount of EC existing in the surfaces of an electrode plate is the largest, and also the electrolyte is not unevenly distributed but uniformly impregnated. However, in the surface in which the grooves 10 are not formed, the amount of electrolyte is reduced to increase an internal resistance, so that a cycle life thereof is reduced.

By forming the grooves 10 so that each of the grooves 10 extends from one end to the other end of the negative electrode active material layer 13 in the widthwise direction thereof, the electrolyte injection property of injecting an electrolyte into the electrode group 1 is dramatically improved. Thus, the electrolyte injection time can be largely reduced. In addition, since the impregnation of the electrolyte into the electrode group 1 is drastically improved, the occurrence of dry-up of electrolyte can be effectively suppressed at a time of charge/discharge when the components together function as a battery, and also a nonuniform distribution of the electrolyte in the electrode group 1 can be avoided. Moreover, with the grooves 10 formed so that each of the grooves 10 makes an angle with a longitudinal direction of the negative electrode plate 3, the impregnation of the electrolyte into the electrode group 1 is increased and also the generation of a stress in the winding process for forming the electrode group 1 can be suppressed. Thus, cutting of the negative electrode plate 3 in the negative electrode plate 3 can be effectively prevented.

Note that in the above-described embodiment, the case where the grooves 10 are formed in the negative electrode plate 3, which is one of the electrode plates, has been described. To achieve high efficient production by improving the electrolyte injection property of injecting the electrolyte into the electrode group 1, or impregnation, using the grooves 10, the grooves 10 can be formed in either one of the positive electrode plate 2 and the negative electrode plate 3. The electrolyte injection property or impregnation can be improved by forming the grooves 10 in either electrode plate. In such case, as long as the grooves 10 having the same depth D are formed with the same pitch P, the electrolyte injection property, or impregnation can be improved in the same manner by forming the grooves 10 in either electrode plate. When grooves are formed in a positive electrode plate 2 of a lithium secondary battery, the positive electrode plate 2 has an active material layer which is harder than that of a negative electrode plate 3 and thus a large pressure has to be applied in forming grooves. In contrast, when the grooves 10 are formed in the negative electrode plate 3 of the above-described embodiment, the grooves 10 can be formed by applying a small pressure.

The present invention has been described using a preferred embodiment of the present invention. However, the present invention is not limited to the embodiment and, as a matter of course, various modifications are possible. For example, in this embodiment, as the electrode group 1, a configuration including the positive electrode plate 2 and the negative electrode plate 3 spirally wound with the separator 4 interposed therebetween is used. However, even when the electrode group 1 has a configuration in which the positive electrode plate 2 and the negative electrode plate 3 are stacked with the separator 4 interposed therebetween, the same effects can be achieved.

Second Embodiment

According to the first embodiment, an electrode plate for a battery, having good impregnation with an electrolyte and also good productivity and reliability can be achieved. To realize practical application of such electrode plate for a battery, it is required to produce the electrode plate with high accuracy and high productivity. Specifically, as for formation of the grooves 10, the grooves 10 have to be formed in an entire surface of each of active material layers provided on both surfaces of the core material 12 in the both-surface coated part 14 so as to have a predetermined depth with high accuracy, but not formed in a surface of an active material layer provided in the one-surface coated part 17. Also, grooves have to be formed while the negative electrode plate hoop material 11 including three different types of parts, i.e., the both-surface coated part 14, the one-surface coated part 17 and the core material exposed part 18 having different thicknesses is stably conveyed with a constant tension applied and a constant moving speed maintained at all the time.

In this embodiment, a method and an apparatus for producing an electrode plate for a battery, which satisfies the above-described requirements, will be described.

Figure 6:
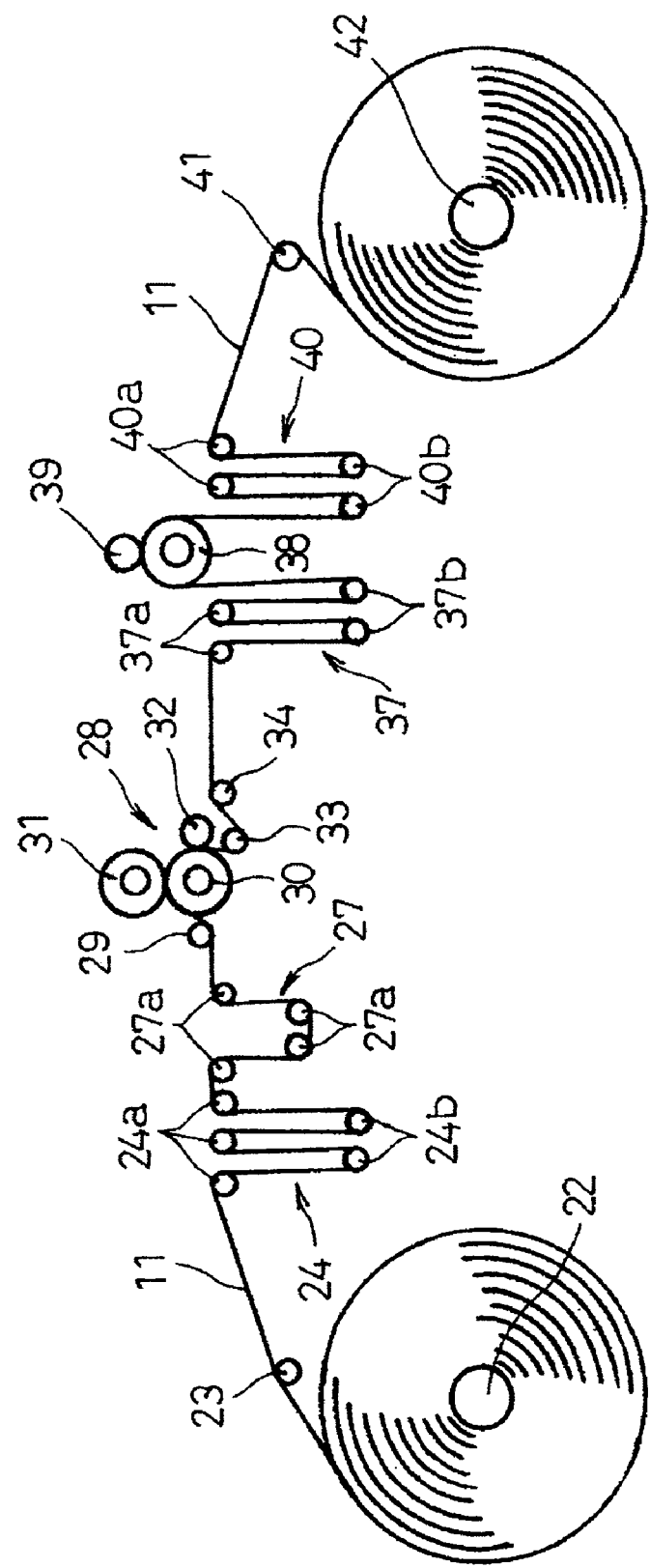
FIG. 6 is a view schematically illustrating an entire configuration of an apparatus for producing an electrode plate for a battery according to a second embodiment of the present invention.

FIG. 6 is a view schematically illustrating an entire configuration of the apparatus for producing an electrode plate for a battery according to this embodiment. As shown in FIG. 6, after the negative electrode plate hoop material 11 wound around an uncoiler 22 is unreeled from the un-coiler 22 while being guided by an uncoiler side guide roller 23, the negative electrode plate hoop material 11 is passed through a supply side dancer roller mechanism 24 (including a combination of three supporting rollers 24a located in an upper side and two dancing rollers 24b located in a lower side) and a meandering preventing mechanism 27 (including four rollers 27a arranged in a rectangular shape) in this order and then is supplied to a groove processing mechanism section 28. The groove processing mechanism section 28 includes a supply side winding guide roller 29, a fixed side groove processing roller (which will be hereinafter referred to merely as a "fixed roller") 30, a movable side groove processing roller (which will be hereinafter referred to merely as a "movable roller") 31, an auxiliary driving roller 32, and an output side winding guide roller 33.

The negative electrode plate hoop material 11 shown in FIG. 2(a) is passed through the groove processing mechanism section 28 and thereby, as shown in FIG. 2(b), the grooves 10 are formed only in the negative electrode active material layers 13 provided in both surfaces of each of the both-surface coated parts 14 in the negative electrode plate hoop material 11. The negative electrode plate hoop material 11 to which groove processing has been performed is guided by an output side dancer roller mechanism 37 (including a combination of three supporting rollers 37a in an upper side and two dancing rollers 37b in a lower side) via a direction change guide roller 34. After that, the negative electrode plate hoop material 11 is passed through between a secondary driving roller 38 and a convey assisting roller 39, is supplied to a winding adjusting dancer roller mechanism 40 (including three supporting rollers 40a in an upper side and two dancing rollers 40b in a lower side), and finally is wound up around a coiler 42 via an winding side guide roller 41.

In the dancer roller mechanisms 24 and 37, the supporting rollers 24a and the supporting rollers 37a are fixedly provided, respectively, and the dancing rollers 24b and the dancing rollers 37b are provided, respectively, so as to be able to freely move up and down. When a tension applied to the negative electrode plate hoop material 11 being conveyed is changed, the dancing rollers 24b and the dancing rollers 37b are automatically moved up and down, so that the supply side dancer roller mechanisms 24 and 37 function to keep the tension applied to the negative electrode plate hoop material 11 constant at all the time. Accordingly, a constant tension is maintained at all the time in part of the negative electrode plate hoop material 11 located between the dancer roller mechanisms 24 and 37. Thus, in the groove processing mechanism section 28, the negative electrode plate hoop material 11 can be conveyed at a predetermined conveying speed only by adding a small conveying force to the negative electrode plate hoop material 11.

A tension applied to the negative electrode plate hoop material 11 is independently set to be constant in each of the groove processing mechanism section 28 side and the coiler 42 side to automatically adjust the rotation speed of the secondary driving roller 38 and the location of a dancing roller 40b of the winding adjusting dancer roller mechanism 40 in the vertical direction. Thus, the negative electrode plate hoop material 11 is wound around the coiler 42 so that winding is tight at the beginning and then is gradually loosened as a diameter of a wound roll of the negative electrode plate hoop material 11 becomes larger. With this configuration, the negative electrode plate hoop material 11 in which the grooves 10 are formed can be finely wound around the coiler 42 without winding dislocation.

Figure 7:
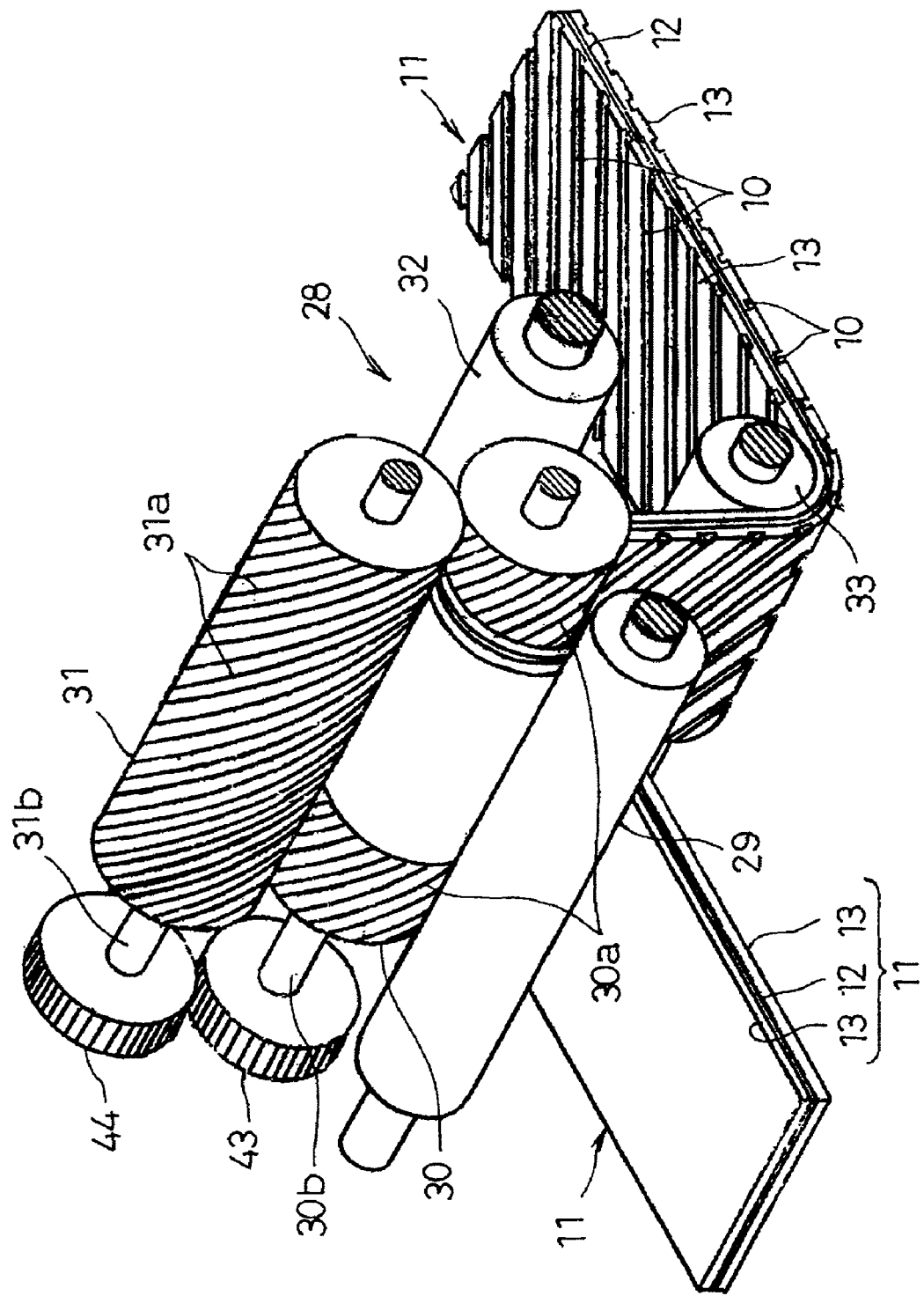
FIG. 7 is an enlarged perspective view illustrating a configuration of a groove processing mechanical section according the second embodiment of the present invention.

FIG. 7 is an enlarged schematic view illustrating a configuration of the groove processing mechanism section 28 of FIG. 6. The fixed roller 30 and the movable roller 31 are identical to each other, and a plurality of groove processing line projections 30a and 31a are formed respectively thereon so that each of the groove processing line projections 30a and 31a makes an angle of 45 degrees with a center of axis of an associated one of the rollers 30 and 31. The fixed and movable rollers 30 and 31 are arranged one above the other and the negative electrode plate hoop material 11 is passed through a space therebetween. Thus, the grooves 10 are formed, as shown in FIG. 3, in the negative electrode active material layers 13 provided in each of the both surfaces of the both-surface coated parts 14 in the negative electrode plate hoop material 11 so as to intersect with one another at right angles in a grade separated crossing manner.

The fixed roller 30 is fixedly placed, and the movable roller 31 is placed to be able to vertically move up and down within a predetermined small range. A rotating force by a servomotor or the like is transmitted to the fixed roller 30. Then, the rotation of the fixed roller 30 is transmitted to the movable roller 31 via the pair of gears 43 and 44 which are rotatably attached to respective roller axes 30b and 31b of the rollers 30 and 31 and meshed with each other. Thus, the rollers 30 and 31 are rotated at the same rotation speed.

The supply side winding guide roller 29 and the output side winding guide roller 33 are placed in relative positions with respect to the fixed roller 30, which allows the negative electrode plate hoop material 11 to wind half around outer surface of the fixed roller 30. At a location in a previous stage of the output side winding guide roller 33, the auxiliary driving roller 32 having a flat surface in which line projections for groove processing are not provided is arranged so as to apply a small pressure to press the negative electrode plate hoop material 11 against the fixed roller 30. The auxiliary driving roller 32 is pressed against part of the negative electrode plate hoop material 11 wound around the fixed roller 30 by the output side winding guide roller 33.

Figure 8:
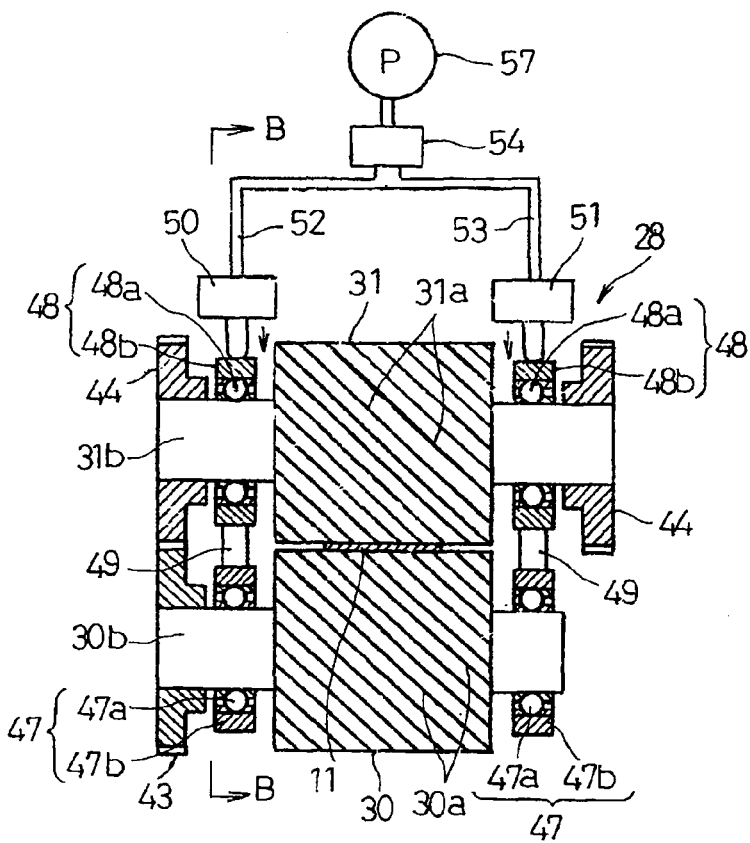
FIGS. 8(a) through 8(c) are views illustrating a configuration of groove processing rollers according to the second embodiment of the present invention.
Figure 8:
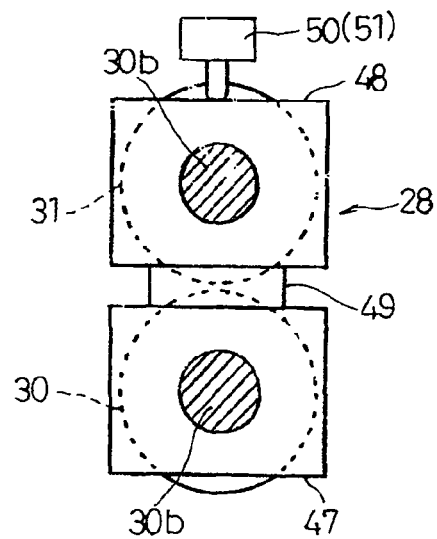
Figure 8:
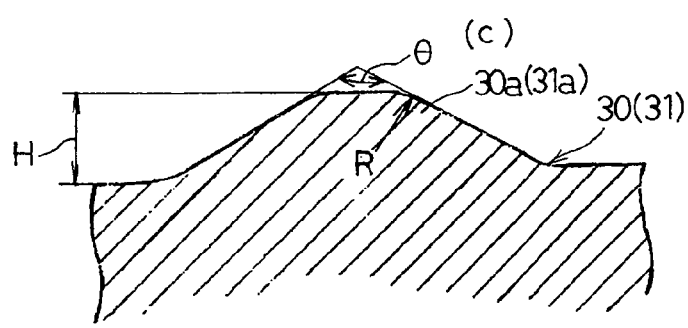

FIGS. 8(a) through 8(c) are views illustrating the fixed roller 30 and the movable roller 31 when the one-surface coated part 17 of the negative electrode plate hoop material 11 is passed through the space between the rollers 30 and 31. FIG. 8(a) is a vertical cross-sectional view taken along a line passing through respective centers of the rollers 30 and 31. FIG. 8(b) is a cross-sectional view take along the line B-B of FIG. 8(a). The roller axes 30b and 31b of the rollers 30 and 31 are rotatably supported by a pair of ball bearings 47 and a pair of ball bearings 48, respectively, at their end vicinity portions. The roller axes 30b and 31b of the rollers 30 and 31 are supported so as to fit the ball bearings 47 and 48, respectively, in a press fit manner where a space is not provided between each roller axis and an associated one of the bearings except for a necessary space for each of the ball bearings 47 and 48 to rotate between each of the roller axes 30b and 31b and an associated one of the ball bearings 47 and 48. In the ball bearings 47 and 48, balls 47a and 48a are provided so as to fit with bearing holders 47a and 48a, respectively, in a press fit manner so that no space is provided therebetween.

When the grooves 10 are formed by a constant-pressure method, the apparatus for producing an electrode plate for a battery has to be configured so that the negative electrode plate hoop material 11 is passed though the space between the rollers 30 and 31 without the grooves 10 being formed in the one-surface coated part 17 of the negative electrode plate hoop material 11. To achieve such a configuration, stoppers (distance adjusting means) 49 are provided between the rollers 30 and 31. The stoppers 49 prevent the movable roller 31 from moving out of the range of the space between the rollers 31 and 30, with which the grooves 10 are not formed in the one-surface coated part 17, and becoming closer to the fixed roller 30. Thus, the negative electrode plate hoop material 11 can be passed through between the rollers 30 and 31 without the grooves 10 being formed in the one-surface coated part 17.

Assume that the negative electrode plate 3 is thin. The thickness of the both-surface coated part 14 is only about 120 μm and thus the grooves 10 having a depth D of 8 μm have to be formed in the thin both-surface coated part 14 with high accuracy within a margin of error of ±1 μm. Therefore, the rollers 30 and 31 are placed without providing any tolerance space between each of the roller axes 30b and 31b and an associated one of the ball bearings 47 and 48, and also between each of the balls 47a and 48a of the ball bearings 47 and 48 and an associated one of the bearing holders 47b and 48b, so that only a necessary space for each of the balls 47a and 48a of the ball bearings 47 and 48 to freely rotate is provided. Thus, wobbling of the rollers 30 and 31 is prevented.

In addition, the groove processing mechanism section 28 includes the following groove processing mechanism in order to form the grooves 10 with high accuracy.

The movable roller 31 is configured so that pressures are respectively applied to two parts of its roller axis 31a symmetrically located about its roller body by separate air cylinders 50 and 51. Air pipes 52 and 53 for supplying air to the air cylinders 50 and 51 branch from the same air path and have the same pipe length, so that the same pressure is applied to the two parts of the roller axis 31b at all the time. Moreover, a precise decompression valve 54 is provided at part of the air path at which the air pipes 52 and 53 branch out. The precise decompression valve (pressure adjusting means) 54 is provided for maintaining an air pressure supplied from an air pump 57 to be a setting value at all the time and supplying the air pressure to the air cylinders 50 and 51.

Specifically, each of the both-surface coated parts 14 of the negative electrode plate hoop material 11 is adjusted to have a uniform thickness by rolling the negative electrode active material layer 13 using roll pressing. However, the thickness of the both-surface coated parts 14 still varies by 1-2 μm. When this variation in thickness of the both-surface coated parts 14 causes increase the pressure of the air cylinders 50 and 51, the precise decompression valve 54 functions to automatically exhaust excess air and maintain a predetermined pressure at all the time. Accordingly, the air pressure of the air cylinders 50 and 51 is automatically adjusted to be a predetermined setting pressure at all the time, regardless of variations in thickness of the both-surface coated parts 14. Thus, the amount of embedded parts of the groove processing line projections 30a and 31a of the fixed and movable rollers 30 and 31 can be made uniform, regardless of variations in thickness of the both-surface coated parts 14, and the grooves 10 having a predetermined depth D can be formed with precision. Note that, instead of the air cylinders 50 and 51, hydraulic cylinders or servomotors may be used.

The movable roller 31 is configured to receive a rotating force of the fixed roller 30 only from one side of the roller axis 31b due to the gears 43 and 44 being meshed with each other. Another gear 44 having the same weight as that of the gear 44 is provided at the other side of the roller axis 31b. The gear 44 at the other side functions as a balancer. Therefore, the gear 44 at the other side may be replaced with a plate shaped balancer. With the balancer, a pressure can be uniformly applied by the movable roller 31 to the negative electrode plate hoop material 11 in the widthwise direction of the negative electrode plate hoop material 11.

FIG. 8(c) is a cross-sectional view of part of the fixed and movable roller 30 (31) in which the groove processing line projections 30a (31b) is formed. The line projections 30a and 31b each have a cross section with which the grooves 10 having the cross-sectional shape of FIG. 4 can be formed. Specifically, the line projections 30a and 31b each have an arc cross-sectional shape having an end angle θ of 120 degrees and an end curvature R of 30 μm. By setting the end angle θ to be 120 degrees, a ceramic layer formed on a surface of an iron core can be prevented from being damaged. Moreover, by setting the end curvature R to be 30 μm for the line projections 30a and 31a, cracks are not generated in the negative electrode active material layer 13 when the line projections 30a and 31a are pressed against the negative electrode active material layer 13 to form the grooves 10.

The groove processing line projections 30a and 31a are formed in the manner described above by thermal spraying chrome oxide onto an entire surface of an iron roller body to coat the iron roller body and then irradiating the ceramic layer obtained by the thermal spraying with a laser to partially melt the ceramic layer, so that a predetermined pattern is made. Thus, the groove processing line projections 31a and 30a can be formed so as to have the above-described shape with high accuracy. By using the above-described method for forming the line projections, each of end angle parts of the line projections 30a and 31a can be made an arc shape having a curvature R of 30 μm with accuracy, as described above and, consequently, each of foot parts of the line projections 30a and 31a has an arc shape. In other words, the groove processing line projections 30a and 31a are formed so as to have a shape with no sharp edge. Because of this, it is even less likely that the ceramic layer on a surface of each of the fixed and movable rollers 30 and 31 is damaged.

Figure 9:
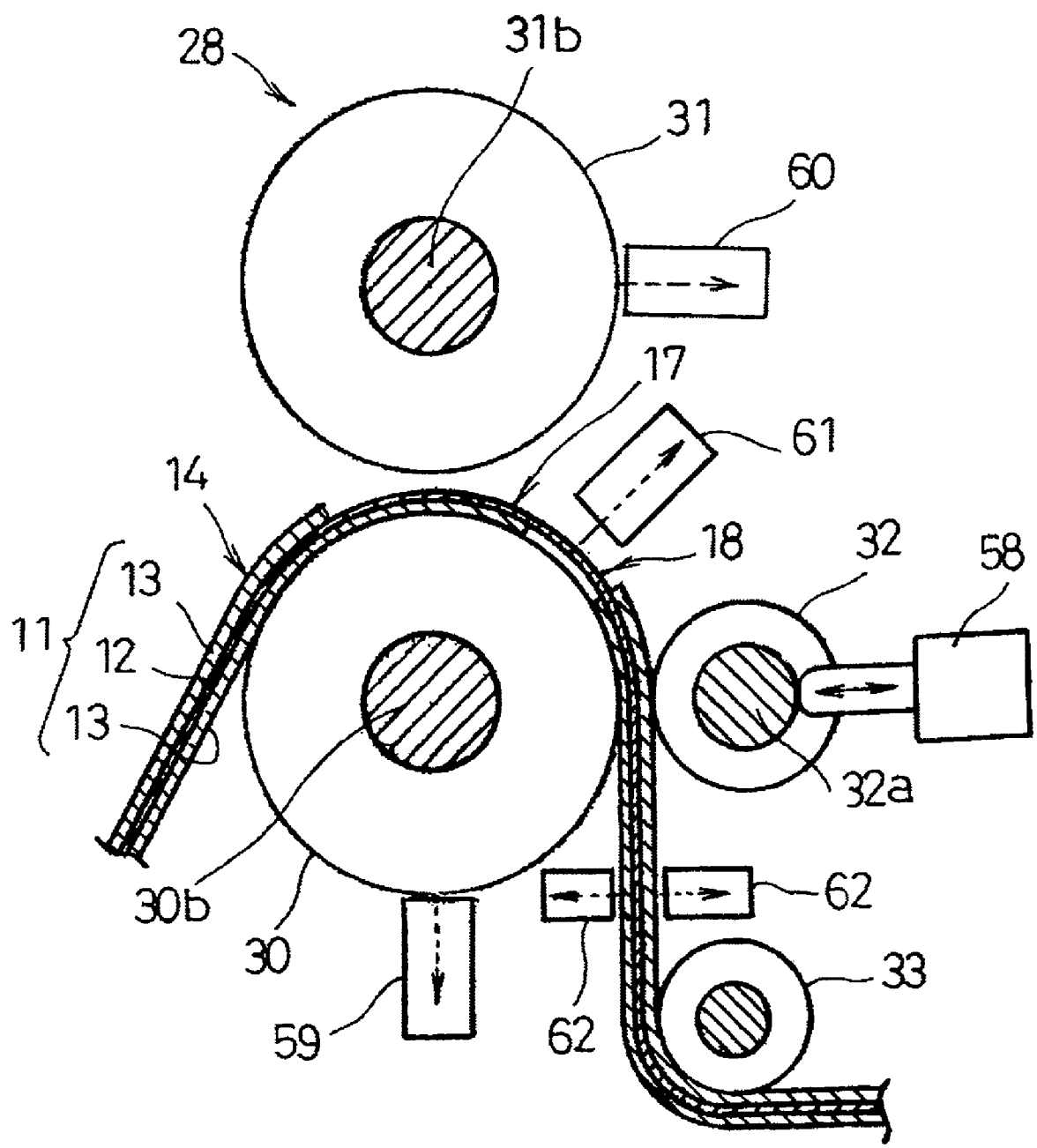
FIG. 9 is a side view of the groove processing mechanical section of the second embodiment of the present invention.
Figure 10:
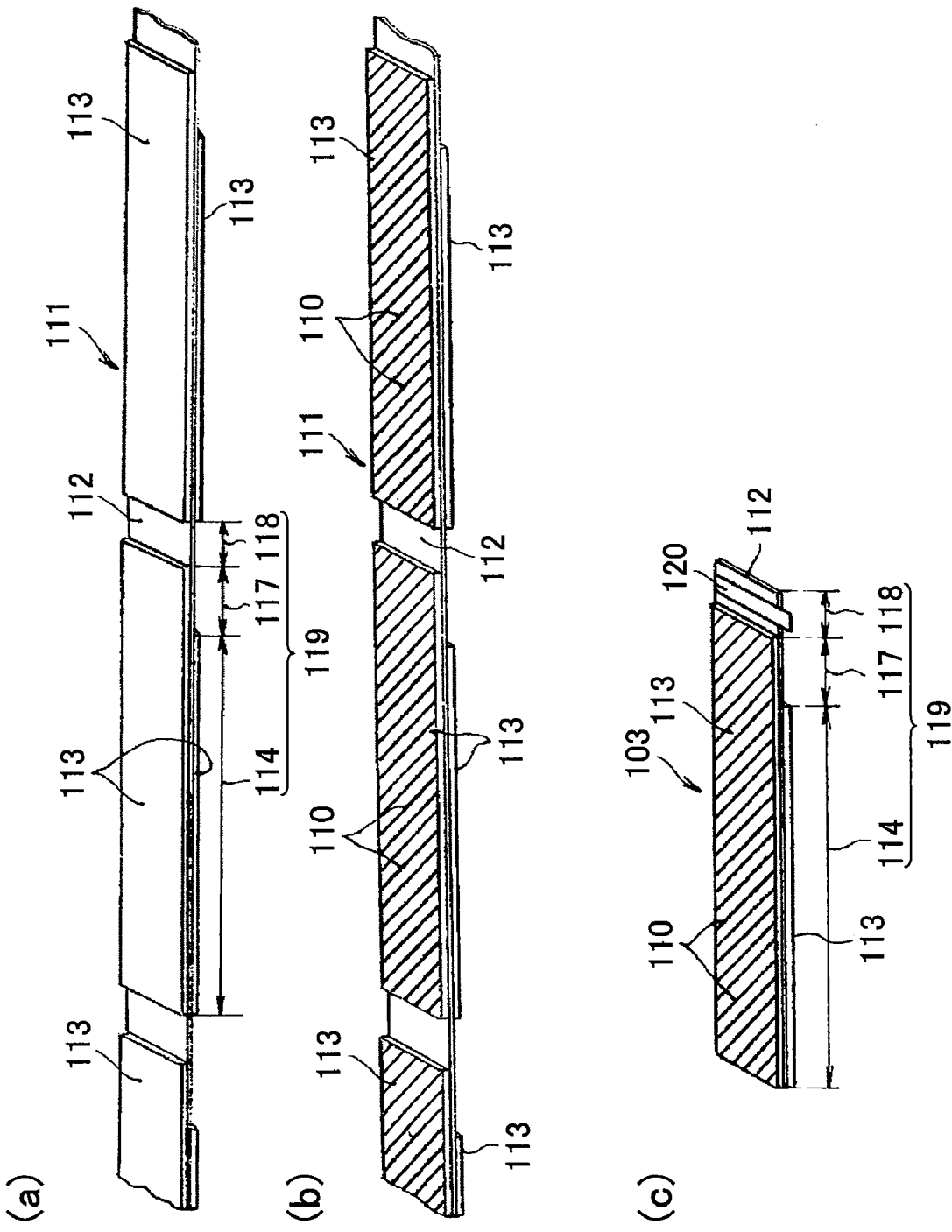
FIGS. 10(a) through 10(c) are perspective views illustrating respective steps for producing a known electrode plate for a battery.

FIG. 9 is a side view of the groove processing mechanism section 28. The auxiliary driving roller 32 is formed of rubber made of silicone having a hardness of about 80 and is provided so as to be able to move a predetermined distance in a horizontal direction in which the auxiliary driving roller 32 is brought in contact with and apart from the fixed roller 30. The auxiliary driving roller 32 is a free roller to which driving force is not applied. A pressure is applied to a roller axis 32a of the auxiliary driving roller 32 by an auxiliary conveying force applying air cylinder 58, so that the auxiliary driving roller 32 presses the negative electrode plate hoop material 11 in which the grooves 10 are formed in the both-surface coated parts 14 against the fixed roller 30. A load applied to the negative electrode plate hoop material 11 by the auxiliary driving roller 32 is adjusted by an air pressure of the air cylinder 58 to be constant at all the time. Specifically, the air pressure of the air cylinder 58 is automatically adjusted so that a load which does not cause the line projections 30a of the fixed roller 30 to form the grooves 10 in the negative electrode active material layer 13 provided in each of the one-surface coated parts 17 is applied to the auxiliary driving roller 32 at all the time when the one-surface coated parts 17 of the negative electrode plate hoop material 11 are passed through between the fixed roller 30 and the auxiliary driving roller 32.

As shown in FIG. 9, the negative electrode plate hoop material 11 is set so as to be passed through between the fixed and movable rollers 30 and 31 so that the negative electrode active material layer 13 provided in each of the one-surface coated parts 17 face the fixed roller 30. Thus, the stoppers 49 can prevent the movable roller 31 from pressing the one-surface coated parts 17 when the one-surface coated parts 17 of the negative electrode plate hoop material 11 are passed through between the rollers 30 and 31. If the negative electrode plate hoop material 11 is arranged so that the negative electrode active material layer 13 in each of the one-surface coated parts 17 faces the movable roller 31, and is conveyed, in order to avoid forming the grooves 10 in the negative electrode active material layer 13 in each of the one-surface coated parts 17, means for pushing the movable roller 31 up to a location where the movable roller 31 is apart from the negative electrode active material layer 13 in each of the one-surface coated parts 17 has to be provided, instead of the stoppers 49. In that case, it becomes difficult to smoothly move the movable roller 31 up and down.

Dust collection nozzles 59 and 60 for sucking an active material attached to a roller surface for cleaning are arranged in vicinity of respective roller surfaces of the fixed and movable rollers 30 and 31, respectively. In this arrangement, a space between each of respective ends of the dust collection nozzles 59 and 60 and an associated roller surface is set to be about 2 mm. Moreover, a dust collection nozzle 61 for sucking an active material attached to the negative electrode plate hoop material 11 for cleaning immediately after the grooves 10 are formed by the rollers 30 and 31 is placed at a location between the space between the rollers 30 and 31, and the auxiliary driving roller 32. Furthermore, a pair of dust collection nozzles 62 are placed at both sides of the negative electrode plate hoop material 11 respectively so as to be located between the auxiliary driving roller 32 and the output side winding guide roller 33. A suction velocity of each of the dust collection nozzles 59 through 62 is set to be 10 m per second or more.

Next, a method for forming an electrode plate for a battery, according to this embodiment will be described.

First, as shown in FIG. 2(a), a negative electrode plate hoop material 11 including both-surface coated parts 14, one-surface coated parts 17 and core material exposed parts 18 is formed by intermittent coating method. The negative electrode plate hoop material 11 is passed through the space between the fixed and movable rollers 30 and 31 of the groove processing mechanism section 28, so that grooves 10 are formed in both surfaces of each of the both-surface coated parts 14 in the negative electrode plate hoop material 11. In the groove processing mechanism section 28, the precise decompression valve 54 for adjusting an air pressure to be supplied to the pair of air cylinders 50 and 51 via the air pipes 52 and 53 having the same length adjusts the air pressure of the pair of air cylinders 50 and 51, automatically and precisely, to a setting value at all the time so that variations in thickness of the both-surface coated parts 14 is absorbed. Thus, the movable roller 31 is pressed against the both-surface coated parts 14 with a constant pressure at all the time. That is, the fixed and movable rollers 30 and 31 convey the negative electrode plate hoop material 11 while pressing the both-surface coated parts 14 from both sides with application of a predetermined pressure by a constant pressure method, thereby forming the grooves 10 in both surfaces of the both-surface coated parts 14 in negative electrode plate hoop material 11. Thus, regardless of variations in thickness of the both-surface coated parts 14, the grooves 10 are reliably formed by the groove processing line projections 30a and 31a of the rollers 30 and 31 in the negative electrode active material layer 13 so as to have a predetermined depth D, which is set to be 8 μm, at all the time.

Furthermore, as described above, the rollers 30 and 31 are supported by the ball bearings 47 and 48 so as to be able to freely rotate without any tolerance space, so that wobbling of the rollers 30 and 31 is prevented. In addition, the negative electrode plate hoop material 11 is wound half around an outer surface of the fixed roller 30 and is conveyed, so that even when a tension applied to the negative electrode plate hoop material 11 is small, wobbling can be suppressed. Thus, the movable roller 31 can receive a setting pressure from the air cylinder 50 and 51 at all the time and also the grooves 10 having a depth D of 8 μm can be formed in the both-surface coated parts 14 in the negative electrode plate hoop material 11 with high accuracy within a margin of error of ±1 μm. Moreover, when the one-surface coated parts 17 are passed between the rollers 30 and 31, fall-off of an active material from the negative electrode active material layer 13 in each of the one-surface coated parts 17 due to wobbling does not occur.

The movable roller 31 has to be configured to smoothly move up and down according to variations in thickness of the both-surface coated parts 14 in the negative electrode plate hoop material 11. When the movable roller 31 is located at an upper limit and the space between the movable roller 31 and the fixed roller 30 is too large, reproducibility is lost. Taking this into consideration, a range of up and down movement of the movable roller 31 has to be determined.

Note that, when the grooves 10 having a depth D of 8 μm are formed in each of the negative electrode active material layers 13 in the both-surface coated parts 14 each having a thickness of about 200 μm, the space between the fixed and movable rollers 30 and 31 has to be determined taking into account a space for each of the ball bearings 47 and 48 to rotate and buckling of the negative electrode plate hoop material 11, and also has to be set so that the groove processing line projections 30a and 31a are embedded to a necessary depth or a larger depth in the negative electrode active material layers 13. Therefore, practically, a space is provided between the rollers 30 and 31.

The negative electrode plate hoop material 11 is controlled by the meandering preventing mechanism 27 of FIG. 6 so as to be reliably passed through the space between the fixed and movable rollers 30 and 31. Also, the movable roller 31 is configured so that a uniform pressure is applied to the negative electrode plate hoop material 11 in the widthwise direction thereof by the gears 44 provided at both sides of the movable roller 31 and having the same weight. Accordingly, the grooves 10 are formed in the both-surface coated parts 14 of the negative electrode plate hoop material 11 so that the depth D of the grooves 10 is uniform in the widthwise direction of the negative electrode plate hoop material 11.

When each of the one-surface coated parts 17 of the negative electrode plate hoop material 11 is passed through the space between the fixed and movable rollers 30 and 31, the movable roller 31 is brought in contact with the pair of stoppers 49 provided at both sides thereof and thus is prevented from getting closer to the fixed roller 30, so that, as shown in FIG. 9, the movable roller 31 is spaced from the negative electrode plate hoop material 11. The negative electrode active material layer 13 in each of the one-surface coated parts 17 is passed through between the rollers so that the fixed roller 30 is not pressed against the negative electrode active material layer 13 in each of the one-surface coated parts 17 and the grooves 10 are not formed in the negative electrode active material layer 13. In this process step, the smallest space between the rollers 30 and 31 is set as the space for the ball bearings 47 and 48 to rotate so that the grooves 10 are not formed in the negative electrode active material layer 13 provided in each of the one-surface coated parts 17.

In this embodiment, the space between the fixed and movable rollers 30 and 31 at a time when each of the both-surface coated parts 14 is passed through the space is set by air pressure of the air cylinder 50 and 51. However, at a time when each of the one-surface coated parts 17 enters the space between the rollers 30 and 31, the movable roller 31 moves downward, becomes in contact with the stoppers 49 and is stopped with a space from the fixed roller 30. This space is larger than the thickness of the one-surface coated parts 17 and therefore the grooves 10 are not formed by the fixed roller 30 in the negative electrode active material layer 13 in each of the one-surface coated parts 17.

Meantime, as shown in FIG. 9, application of a conveying force to the negative electrode plate hoop material 11 by the fixed and movable rollers 30 and 31 pressing the negative electrode plate hoop material 11 from both sides is released. Then, the fixed roller 30 and the auxiliary driving roller 32 press the negative electrode plate hoop material 11 from both sides, thereby applying a conveying force to the negative electrode plate hoop material 11. At this time, the auxiliary driving roller 32 is pressed by only a small pressure with which the grooves 10 formed in the both-surface coated parts 14 are not crushed, but a constant tension is maintained in the negative electrode plate hoop material 11 between the supply side and output side dancer roller mechanisms 24 and 37 at all the time. Thus, the negative electrode plate hoop material 11 can be reliably conveyed at predetermined convey speed with a constant tension applied at all the time only by applying a small conveying force with application of a small pressure by the auxiliary driving roller (conveying force applying means) 32.

That is, even when each of the one-surface coated parts 17 and the core material exposed parts 18 in the negative electrode plate hoop material 11 reaches the space between the fixed and movable rollers 30 and 31 and application of conveying force to the negative electrode plate hoop material 11 by the rollers 30 and 31 pressing the negative electrode plate hoop material 11 from both sides is released, convey of the negative electrode plate hoop material 11 at unexpectedly high speed by application of a tension to the negative electrode plate hoop material 11 does not occur. Therefore, the negative electrode plate hoop material 11 is conveyed between the rollers 30 and 31 without being loosened at all the time, and also expansion of the negative electrode plate hoop material 11 due to application of a strong tension is not caused.

Moreover, as shown in FIG. 9, the auxiliary driving roller 32 is in contact with the both-surface coated parts 14 in an entire period in which each of the core material exposed parts 18 and the one-surface coated parts 17 of the negative electrode plate hoop material 11 is passed through the space between the rollers 30 and 31. In the period, an air pressure of the auxiliary conveying force applying air cylinder 58 is automatically adjusted so that a small pressure which is small enough not to cause the auxiliary driving roller 32 to crush the grooves 10 formed in the both-surface coated parts 14 is applied to the auxiliary driving roller 32.

As shown in FIG. 7 and FIG. 9, the negative electrode plate hoop material 11 is configured to be half wound around the outer surface of the fixed roller 30 by the supply side winding guide roller 29 and the output side winding guide roller 33 and is conveyed in that state. Thus, in conveying the negative electrode plate hoop material 11, brattling of the negative electrode plate hoop material 11 can be effectively suppressed and, accordingly, fall-off of an active material from the negative electrode active material layer 13 which occurs along brattling is not caused. Also, in contrast to the known technique in which the negative electrode plate hoop material 11 can be conveyed at a convey speed of only about 5 m/sec, the negative electrode plate hoop material 11 can be stably conveyed at high speed, i.e., a convey speed of about 30-50 m/sec. Therefore, the negative electrode plate 3 can be produced with high productivity.

As shown in FIG. 9, when the negative electrode plate hoop material 11 is slipped in between the fixed and movable rollers 30 and 31 to form the grooves 10, small pieces of an active material peeled off from the negative electrode active material layers 13 and attached to a circumference surface of each of the rollers 30 and 31 are sucked by the dust collection nozzles 50 and 56 and thus removed, and also small pieces of the active material attached to the negative electrode plate hoop material 11 after processing of the grooves 10 are sucked by the dust collection nozzles 61 and 62 and removed. Therefore, the grooves 10 can be formed in the negative electrode plate hoop material 11 with good reproducibility.

EXAMPLES

Hereinafter, a configuration and effects of the present invention will be further described with reference to examples. The present invention is not limited by the examples.

(Formation of Negative Electrode Plate Hoop Material)

One hundred parts by weight (40 wt % of solid content) of artificial graphite as a negative electrode active material, 2.5 parts by weight (1 part by weight in terms of solid content) of styrene butadiene copolymer rubber particle dispersing element relative to 100 parts by weight of an active material, as a binder, 1 part by weight of carboxymethylcellulose relative to 100 parts by weight of the active material, as a thickener, were stirred with an adequate amount of water by a blender, thereby forming a negative electrode mixture paste. The negative electrode mixture paste was applied to a current collector core material 12 of a copper foil having a thickness of 10 µm and dried. Then, the current collector core material 12 with the negative electrode mixture paste applied thereon was rolled so as to have a total thickness of about 200 µm and then was cut by a splitter into strips each having a width of about 60 mm, which is a width of a negative electrode plate 3 of a cylindrical lithium secondary battery with a normal capacity of 2550 mAh, a diameter of 18 mm and a height of 65 mm, thereby forming a negative electrode plate hoop material 11. Then, as shown in FIG. 6, the negative electrode plate hoop material 11 was wound around an uncoiler 22.

Next, as each of groove processing rollers (i.e., a fixed roller and a movable roller) 30 and 31, a roller in which line projections each having an end angle θ of 120 degrees and a height H of 25 µm were formed with a pitch of 170 µm on a ceramic outer surface of a roll body having a roll diameter of 100 mm so as to be tilted at an angle of 45 degrees from a circumference direction of the roll body was used. The negative electrode plate hoop material 11 was passed through between the groove processing rollers 30 and 31 to form grooves 10 in both surfaces of each of both-surface coated parts 14 of the negative electrode plate hoop material 11. A groove processing mechanism section 28 was configured so that gears 43 and 44 fixedly attached to roller axes 30b and 31b of the rollers 30 and 31 were meshed with each other and the fixed roller 30 was driven to be rotated by a servomotor, so that the rollers 30 and 31 were rotated at the same rotating speed.

Stoppers 49 for preventing the rollers 30 and 31 from moving to be close to each other at a distance of 100 µm or less was provided between the rollers 30 and 31. Whether or not a correct amount of space between the rollers 30 and 31 was maintained was confirmed. An air pressure of each of the air cylinders 50 and 51 for pressurizing the movable roller 31 was adjusted so that a load of 30 kgf per 1 cm of the negative electrode plate hoop material 11 in the widthwise direction was applied. The air pressure was adjusted by a precise decompression valve. An auxiliary driving roller 32 was formed of silicone having a hardness of about 80 as a surface material. An air pressure of an auxiliary conveying force applying air cylinder 58 for pressurizing the auxiliary driving roller 32 was adjusted so that a load of about 2 kgf per 1 cm of the negative electrode plate hoop material 11 in the widthwise direction was applied. The negative electrode plate hoop material 11 was conveyed with a tension of several kg applied thereto at a predetermined conveying speed. Using the above-described structure, the grooves 10 were formed in each of both surfaces of the both-surface coated parts 14 in the negative electrode plate hoop material 11 in the above-described manner, and the depth D of the grooves 10 in the negative electrode active material layers 13 was measured by a contour measuring device. Then, it was confirmed that an average depth D was 8.5 µm and the grooves 10 were not formed in the negative electrode active material layer 13 in each of one-surface coated parts 17. Moreover, using a laser microscope, whether or not cracks were generated in the negative electrode active material layers 13 was examined and cracks were not found. Note that increase in thickness of the negative electrode plate 3 was about 0.5 µm and expansion per cell in the longitudinal direction was about 0.1%.

(Formation of Positive Electrode Plate Hoop Material)

As a positive electrode active material, lithium nickel composite oxide represented by a composition formula of $LiNi_8Co_{0.1}Al_{0.05}O_2$ was used. Sulfuric acid containing Co and Al at a predetermined ratio was added to a $NiSO_4$ aqueous solution to prepare a saturated aqueous solution. Then, while the saturated aqueous solution was stirred, an alkali aqueous solution in which sodium hydroxide was dissolved was slowly dropped into the saturated aqueous solution to neutralize it and ternary nickel hydroxide $Ni_{0.8}Co_{0.15}Al_{0.05}(OH)_2$ was generated by precipitation. The precipitate was filtered, washed with water and dried at 80° C. An average gain size of nickel hydroxide obtained here was about 10 μm.

Then, lithium hydroxide hydrate was added to nickel hydroxide so that the ratio between the sum of number of atoms of Ni, Co and Al, and the number of atoms of Li was 1:1.03 and heat treatment was performed to nickel hydroxide in an oxygen atmosphere at a temperature of 800° C. for 10 hours, thereby obtaining desired $LiNi_{0.8}CO_{0.15}Al_{0.05}O_2$. It was confirmed by X-ray powder diffraction that obtained lithium nickel composite oxide had a single phase hexagonal crystal structure and Co and Al became a solid solution. Then, pulverization and classification were performed and positive electrode active material powder was obtained.

Five parts by weight of acetylene black as a conductive material was added to 100 parts by weight of an active material, and then a solution obtained by dissolving polyvinylidene fluoride (PVdF) as a binder in a solvent of N-methylpyrrolidone (NMP) was mixed with the mixture of the active material and acetylene black and was kneaded, so that a coating material in paste form was obtained. Note that the amount of PVdF was adjusted to be 5 parts by weight respect to 100 parts by weight of the active material. The paste was applied to both surfaces of a current collector core material of aluminum foil having a thickness of 15 μm and dried. Thereafter, the foil with the paste applied was rolled, thereby forming a positive electrode plate hoop material having a thickness of about 200 μm and a width of about 60 mm.

(Formation of Electrode Group)

Next, the electrode plate hoop materials were dried so that excess moisture was removed, and then the electrode plate hoop materials were wound with a separator 4 of polyethylene porous film having a thickness of about 30 μm interposed therebetween in a dry air room, thereby forming an electrode group 1. The negative electrode plate hoop material 11, which is one of the electrode plate hoop materials, was cut each of the core material exposed parts 18 located between an associated one of the both-surface coated parts 14 and an associated one of the one-surface coated parts 17. Since the groove processing rollers 30 and 31 were set so that the grooves 10 were not formed in the negative electrode active material layer 13 in each of the one-surface coated parts 17, deformation into a curved shape did not occur in the core material exposed parts 18 and one-surface coated parts 17 after cutting the core material exposed parts 18, and reduction in operation of a winding device was not caused. Note that before winding, a current collector lead 20 was attached to the negative electrode plate hoop material 11 using a welding section of the winding device.

Note that as a comparative example, the fixed roller 30 was replaced with a flat roller having no line projections. The space between the movable roller 31 and the fixed roller 30 was set to be 100 μm to adjust a load per 1 cm of the negative electrode plate 3 in the widthwise direction to 31 kg, and then the grooves 10 having a depth D of about 8 μm were formed in the negative electrode active material layer 13 only at one side of the both-surface coated part 14, thereby obtaining a negative electrode plate (Comparative Example 1). Moreover, a negative electrode plate (Comparative Example 2) in which grooves were not formed in the negative electrode active material layers 13 provided in both surfaces of the both-surface coated part 14 was formed.

(Evaluation of Electrolyte Injection Property)

The electrode group 1 formed in the above-described manner was placed in a battery case 7. Thereafter, an electrolyte was injected therein and the electrolyte injection property was examined.

When evaluation of the electrolyte injection property was conducted, an injection method in which an electrolyte of about 5 g was supplied to the battery case and the air was vacuumed to impregnate the electrolyte was used. Note that the electrolyte may be supplied into the battery case by several injections.

After a predetermined amount of the electrolyte was injected, the battery case was placed in a vacuum booth and vacuuming was performed to exhaust the air in the electrode group. Subsequently, an atmosphere was introduced into the vacuum booth, so that the electrolyte was forced to permeate the electrode group due to a differential pressure between a pressure in the battery case and a pressure in the atmosphere. The vacuuming was performed under a vacuum of −85 kpa. An injection time for injection of the electrolyte in this process step was measured and used as injection time data for comparison of the electrolyte injection property.

In actual steps for producing a battery, an electrolyte was supplied simultaneously into a plurality of cells of battery cases and the air was vacuumed at a time under a vacuum of −85 kpa. Thereafter, a step in which the battery cases were opened to an atmosphere so as to force the electrode group to impregnate with the electrolyte was performed to complete injection of the electrolyte. Whether injection was completed was judged by viewing directly from the top of the battery case to confirming that the electrolyte completely disappeared on the electrode place group. Injection of the electrolyte was simultaneously performed to the plurality of cells and an average injection time which could be used for actual production was obtained. Examination results were shown in Table 1.

TABLE 1

| | Whether or not grooves are formed | Arrangement of grooves in electrode group | Injection time |
|---|---|---|---|
| Example | Formed in both surfaces of both-surface coated part, but not formed in one-surface coated part | Inner and outer surfaces | 22 min 17 sec |
| Comparative Example 1 | Formed in one surface of both-surface coated part as well as one surface in one-surface coated part | Inner surface | — |
| Comparative Example 2 | Not formed in both surfaces | None | 69 min 13 sec |

As the results shown in Table 1 clearly shows, the electrolyte injection property was largely improved in the negative electrode plate (Example) in which the grooves 10 were formed in the negative electrode active material layers 13 in e both surfaces of the both-surface coated part 14, compared to the negative electrode plate (Comparative Example 2) in which grooves were not formed in both surfaces of the negative electrode active material layer.

Figure 11:
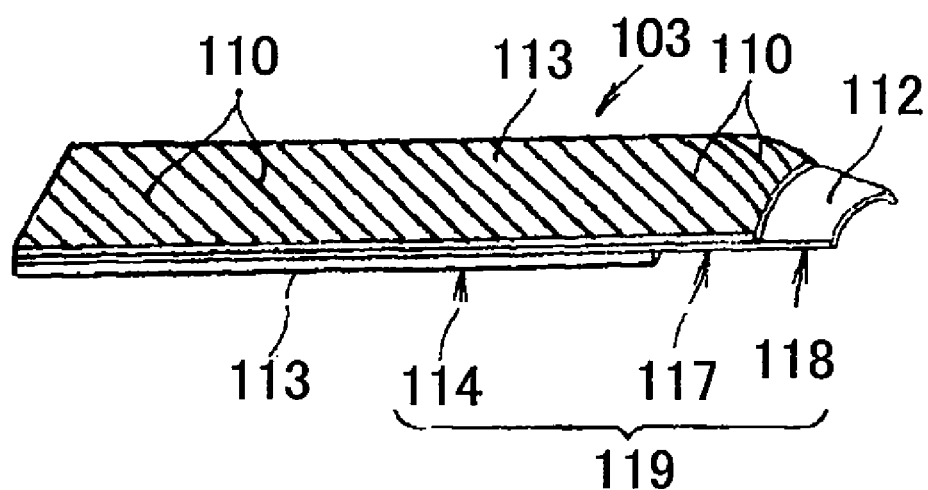
FIG. 11 is a perspective view describing problems of the known electrode plate for a battery.

Moreover, in the negative electrode plate (Comparative Example 1) in which the grooves 10 were formed in the negative electrode active material layer at only one of surfaces of the both-surface coated part 14 as well as the negative electrode active material layer continuously formed at one surface of the adjacent one-surface coated part 17, winding displacement was caused in winding and fall-off of the negative electrode active material from the negative electrode active material layer occurred in the one-surface coated part 17. Thus, the examination of electrolyte injection was stopped in the middle of examination. A reason for this was that when the core material exposed parts located adjacent to the both-surface coated parts 14 in the negative electrode plate hoop material were cut, an internal stress generated in the one-surface coated parts 17 at a time of processing the grooves 10 was released, thus bending the core material exposed parts into a curved shape as shown in FIG. 11. Thus, winding displacement was caused in winding due to the deformation of the electrode plate and also the fall-off of the negative electrode active material occurred because the electrode plate can not be securely gripped by a chuck or the like when being transferred. Note that when the electrolyte was injected into the negative electrode plate (Comparative Example 1) in which the winding displacement and fall-off of the negative electrode active material were caused, the injection time was 30 minutes.

In experimental production of test batteries, a method in which an electrolyte was injected into an electrode group by injecting a predetermined amount of an electrolyte, vacuuming and then opening of the electrode group to an atmosphere was used. In this case, in a battery of Example, the injection time was reduced and thus evaporation of the electrolyte during injection of the electrolyte was reduced. Furthermore, due to the improvement of the electrolyte injection property, the injection time was largely reduced. Thus, with an evaporation amount of an electrolyte suppressed to a minimum level, an opening portion of a battery case can be closely sealed with a sealing member. This shows that electrolyte loss can be largely reduced with improvement of the electrolyte injection property or impregnation.

INDUSTRIAL APPLICABILITY

An electrode plate for a battery according to the disclosure of the present invention has good electrolyte impregnation and also good productivity and reliability. A lithium secondary battery including an electrode group configured using the electrode plate is useful for a driving power supply and the like for mobile electronic devices and communication devices.

The invention claimed is:

1. An electrode plate for a nonaqueous battery, in which an active material layer is formed on a surface of a current collector core material, the electrode plate comprising:
   a both-surface coated part in which the active material layer is formed on both surfaces of the current collector core material;
   a core material exposed part which is an end part of the current collector core material and in which the active material layer is not formed; and
   a one-surface coated part which is provided between the both-surface coated part and the core material exposed part and in which the active material layer is formed on only one of surfaces of the current collector core material,
   wherein a plurality of grooves are formed in both surfaces of the both-surface coated part so as to be tilted from a longitudinal direction of the electrode plate and are not formed in the one-surface coated part, and
   the electrode plate is obtained by cutting an electrode plate hoop material including the both-surface coated part, the one-surface coated part and the core material exposed part being continuously formed in this order at the core material exposed part provided between the both-surface coated part and the one-surface coated part.

2. The electrode plate of claim 1, wherein the grooves are formed in both surfaces of the both-surface coated part so that a phase of the grooves in one surface is symmetric with a phase of the grooves in the other surface.

3. The electrode plate of claim 1, wherein the electrode plate is a negative electrode plate.

4. The electrode plate of claim 1, wherein a depth of the grooves is within a range of 4 μm to 20 μm.

5. The electrode plate of claim 1, wherein the grooves are formed with a pitch of 100 μm to 200 μm along a longitudinal direction of the electrode plate.

6. The electrode plate of claim 1, wherein the grooves are formed so that each of the grooves extends from one end to the other end of the electrode plate in a widthwise direction thereof.

7. The electrode plate of claim 1, wherein the grooves formed in the both surfaces of the both-surface coated part are formed so as to be tilted at an angle of 30 degrees to 90 degrees from a longitudinal direction of the electrode plate so that a tilting direction of the grooves in one surface is different from a tilting direction of the grooves in the other surface and so as to intersect with one another at right angles in a grade separated crossing manner.

8. An electrode group for a battery, in which a positive electrode plate and a negative electrode plate are stacked or wound with a separator interposed therebetween, wherein at least one of the positive electrode plate and the negative electrode plate has the configuration of claim 1.

9. The electrode group of claim 8, wherein the electrode group is wound with the core material exposed part of the electrode plate as a winding start end.

10. A lithium secondary battery, wherein the electrode group of claim 8 is placed in a battery case, a predetermined amount of a nonaqueous electrolyte is injected, and an opening portion of the battery case is closely sealed.

11. A method for producing an electrode plate for a nonaqueous battery, the method comprising the steps of:
   a) preparing an electrode plate hoop material including a both-surface coated part in which an active material layer is provided on both surfaces of a current collector core material, a one-surface coated part in which the active material layer is provided on only one of surfaces of the current collector core material and a core material exposed part in which the active material layer is not provided, the both-surface coated part, the one-surface coated part and the core material exposed part being continuously formed in this order;
   b) rotating a pair of rollers each of which has a plurality of line projections formed on a surface thereof and which are arranged on and under the electrode plate hoop material with the pair of rollers pressed against both surfaces of the electrode plate hoop material to pass the electrode plate hoop material through a space between the pair of rollers, thereby simultaneously forming a plurality of grooves in both surfaces of the both-surface coated part so that the plurality of grooves are tilted from a longitudinal direction of the electrode plate hoop material;
   c) maintaining, after the both-surface coated part is passed through the space between the pair of rollers, the pair of rollers in a no pressure applied state for the one-surface coated part while the one-surface coated part is passed through the space between the pair of rollers; and
   d) cutting the negative electrode plate hoop material at the core material exposed part provided between the both-surface coated part and the one-surface coated part to divide the electrode plate hoop material into electrode plates for a battery.

12. The method of claim 11, wherein in the step (c), a conveying force for passing the electrode plate hoop material through the space between the pair of rollers is generated by a tension applied to the electrode plate hoop material.

13. The method of claim 11, wherein the pair of rollers are a fixed roller and a movable roller,
   in the step (b), grooves having a predetermined depth are formed in both surfaces of the both-surface coated part by rotating the movable roller with the movable roller pressed against a surface of the electrode plate hoop material by application of a constant pressure, and
   in the step (c), the movable roller is maintained in a no pressure applied state for the one-surface coated part and the electrode plate hoop material is put between the fixed roller and an auxiliary driving roller, thereby generating a conveying force for passing the electrode plate hoop material through the space between the pair of rollers.

14. The method of claim 13, in the step (c), the pair of rollers are adjusted so that a tension in the electrode plate hoop material becomes constant both at a supply side and at an output side at all the time, the electrode plate hoop material is wound substantially half around the fixed roller, and part of the electrode plate hoop material which is in a wound state is put between the fixed roller and the auxiliary driving roller, thereby adding a conveying force to the electrode plate hoop material.

15. An apparatus for producing an electrode plate for a nonaqueous battery, the apparatus comprising:
   a pair of rollers each of which has a plurality of line projections formed on a surface thereof;
   conveying force generating means for adding, to an electrode plate hoop material in which an active material layer is formed on the surfaces of a current collector core material, a conveying force for passing the electrode plate hoop material through the space between the pair of rollers;
   pressure adjusting means for adjusting a level of a pressure which the pair of rollers apply to the electrode plate hoop material;
   distance adjusting means for adjusting a distance between the pair of rollers; and
   control means for performing control in a manner in which the electrode plate hoop material formed so that both-surface coated part in which the active material layer is provided on both surfaces of the current collector core material, a one-surface coated part in which the active material layer is provided on only one of surfaces of the current collector core material and a core material exposed part in which the active material layer is not provided are continuously formed in this order is passed though the space between the pair of rollers and the rollers are rotated while being pressed against both surfaces of the negative electrode plate hoop material with application of a constant pressure adjusted by the pressure adjusting means to both surfaces of the electrode plate hoop material, thereby simultaneously forming a plurality of grooves in both surfaces of the both-surface coated part so that the plurality of grooves are tilted from a longitudinal direction of the electrode plate hoop material, and
   after the both-surface coated part is passed through the space between the pair of rollers, the pair of rollers are maintained in a no pressure applied state for the one-surface coated part by the distance adjusting means while the one-surface coated part is passed through the space between the pair of rollers.

16. The apparatus of claim 15, wherein the pair of rollers are a fixed roller and a movable roller,
   the pressure adjusting means includes a mechanism for performing an adjustment so that the movable roller is rotated while pressing a surface of the electrode plate hoop material with a constant pressure,
   the distance adjusting means includes a stopper for preventing the movable roller from pressing the one-surface coated part while the one-surface coated part is passed through the space between the rollers, and
   the conveying force generating means includes a mechanism for generating a conveying force for passing the electrode plate hoop material through the space between the pair of rollers by putting the electrode plate hoop material between the fixed roller and an auxiliary driving roller.

17. A method for producing an electrode plate for a non-aqueous battery, the method comprising the steps of:
   preparing an electrode plate hoop material including the both-surface coated part in which the active material layer is provided on both surfaces of the current collector core material, the one-surface coated part in which the active material layer is provided on only one surface of the current collector core material and a core material exposed part in which the active material layer is not provided, the both-surface coated part, the one-surface coated part and the core material exposed part being continuously formed in this order;
   forming the plurality of grooves on both surfaces of the both-surface coated part; and
   cutting the electrode plate hoop material at the core material exposed part provided between the both-surface coated part and the one-surface coated part to divide the electrode plate hoop material into electrode plates for a battery,
   wherein in the forming step, the grooves are not formed on the surface of the one-surface coated part.

* * * * *